United States Patent
Tang et al.

(10) Patent No.: US 10,479,689 B2
(45) Date of Patent: Nov. 19, 2019

(54) ULTRATHIN GRAPHENE PIECE, APPARATUS FOR PREPARING ULTRATHIN GRAPHENE PIECES, METHOD FOR PREPARING ULTRATHIN GRAPHENE PIECES, CAPACITOR, AND METHOD OF MANUFACTURING CAPACITOR

(71) Applicant: NATIONAL INSTITUTE FOR MATERIALS SCIENCE, Ibaraki (JP)

(72) Inventors: Jie Tang, Ibaraki (JP); Qian Cheng, Ibaraki (JP); Norio Shinya, Ibaraki (JP); Luchang Qin, Ibaraki (JP)

(73) Assignee: NATIONAL INSTITUTE FOR MATERIALS SCIENCE, Ibaraki (JP)

( * ) Notice: Subject to any disclaimer, the term of this patent is extended or adjusted under 35 U.S.C. 154(b) by 67 days.

(21) Appl. No.: 15/966,539

(22) Filed: Apr. 30, 2018

(65) Prior Publication Data
US 2018/0244526 A1 Aug. 30, 2018

Related U.S. Application Data

(62) Division of application No. 14/437,622, filed as application No. PCT/JP2013/078485 on Oct. 21, 2013, now abandoned.

(30) Foreign Application Priority Data

Oct. 24, 2012 (JP) ................................. 2012-234271

(51) Int. Cl.
*C01B 32/19* (2017.01)
*H01G 11/32* (2013.01)
(Continued)

(52) U.S. Cl.
CPC .............. *C01B 32/19* (2017.08); *B82Y 30/00* (2013.01); *B82Y 40/00* (2013.01); *C01B 32/184* (2017.08);
(Continued)

(58) Field of Classification Search
CPC ... C01B 31/0469; C01B 31/0446; C25B 9/00; C25B 13/02; H01G 9/145; H01G 9/042;
(Continued)

(56) References Cited

U.S. PATENT DOCUMENTS

| 1,378,834 A | 5/1921 | Bullock |
| 2012/0048804 A1 | 3/2012 | Stetson et al. |
| 2013/0295374 A1 | 11/2013 | Tang et al. |

FOREIGN PATENT DOCUMENTS

| CN | 101746755 | 6/2010 |
| WO | 2012/073998 | 6/2012 |
| WO | 2012/120264 | 9/2012 |

OTHER PUBLICATIONS

Zhao, Xin, et al. "Flexible holey graphene paper electrodes with enhanced rate capability for energy storage applications." ACS nano 5.11 (2011): 8739-8749.*
(Continued)

*Primary Examiner* — Richard M Rump
(74) *Attorney, Agent, or Firm* — Wenderoth, Lind & Ponack, L.L.P.

(57) ABSTRACT

The problem addressed by the present invention is to provide an apparatus for preparing ultrathin graphene pieces capable of preparing ultrathin graphene pieces in which less than 10 pieces of graphene are overlapped in large quantities, a method for preparing ultrathin graphene pieces capable of preparing the ultrathin graphene pieces with high yield, an ultrathin graphene piece in which less than 10 pieces of graphene are overlapped, a capacitor having high performance by using the ultrathin graphene piece as an electrode, and an efficient method of manufacturing the capacitor. The above-described problem can be solved by using an apparatus 20 for preparing ultrathin graphene pieces, the apparatus comprising: a graphite electrode 21; a counter electrode 22 which is made of graphite, a corrosion
(Continued)

resistant alloy, or a precious metal; an electrolytic solution 25 in which one end sides of the two electrodes 21 and 22 are immersed; a container 24 which stores the electrolytic solution 25; and a power source 28 which is connected to the two electrodes 21 and 22 via wirings 26 and 27. The apparatus is also provided with a porous filter 23 so as to cover at least the immersed part of the graphite electrode 21 that is immersed in the electrolytic solution 25.

6 Claims, 25 Drawing Sheets

(51) Int. Cl.
    *C01B 32/184*     (2017.01)
    *B82Y 30/00*     (2011.01)
    *B82Y 40/00*     (2011.01)
    *H01G 11/36*     (2013.01)
    *C25B 9/00*     (2006.01)
    *C25B 13/02*     (2006.01)

(52) U.S. Cl.
    CPC ............ *C25B 9/00* (2013.01); *C25B 13/02* (2013.01); *H01G 11/32* (2013.01); *H01G 11/36* (2013.01); *Y02E 60/13* (2013.01)

(58) Field of Classification Search
    CPC ...... H01G 9/0029; H01G 11/32; H01G 11/36; B82Y 30/00; B82Y 40/00; Y02E 60/13
    See application file for complete search history.

(56) References Cited

OTHER PUBLICATIONS

Merchant, Christopher A., et al. "DNA translocation through graphene nanopores." Nano letters 10.8 (2010): 2915-2921.*
Garaj, Slaven, et al. "Graphene as a subnanometre trans-electrode membrane." Nature 467.7312 (2010): 190.*
Hong, Jinkee, and Sang Wook Kang. "Nanoporous Graphene Oxide Thin Films from Nanohybrid Multilayers." Journal of nanoscience and nanotechnology 11.11 (2011): 10116-10122.*
Communication Pursuant to Article 94(3) EPC dated Dec. 12, 2017 in European Application No. 13 848 707.9.
Communication Pursuant to Article 94(3) EPC dated May 16, 2018 in European Application No. 13 848 707.9.
International Search Report dated Jan. 21, 2014 in International (PCT) Application No. PCT/JP2013/078485.
G. M. Morales et al., "High-Quality Few Layer Graphene Produced by Electrochemical Intercalation and Microwave-Assisted Expansion of Graphite", Carbon, vol. 49, pp. 2809-2816, 2011.
Y. Hernandez et al., "High-Yield Production of Graphene by Liquid-Phase Exfoliation of Graphite", Nature Nanotechnology, vol. 3, No. 9, pp. 563-568, Sep. 2008.
J. Wang et al., "High-Yield Synthesis of Few-Layer Graphene Flakes Through Electrochemical Expansion of Graphite in Propylene Carbonate Electrolyte", Journal of the American Chemical Society, vol. 133, No. 23, pp. 8888-8891, 2011.
V. V. Singh et al., "Greener Electrochemical Synthesis of High Quality Graphene Nanosheets Directly from Pencil and its SPR Sensing Application", Advanced Functional Materials, vol. 22, No. 11, pp. 2352-2362, Jun. 6, 2012.
Japanese Office Action, dated Jan. 28, 2017, in corresponding Japanese patent application No. 2014-543284.
Petersen et al., "Clar sextet analysis of triangular, rectangular, and honeycomb graphene antidote lattices." Acs Nano 5.1 (2010): 523-529.
Zhao et al., "Flexible holey graphene paper electrodes with enhanced rate capability for energy storage applications." ACS nano 5.11 (2011): 8739-8749.
Okotrub, et al., "Perforation of graphite in boiling mineral acid." Physica Status Solidi (b) 249.12 (2012): 2620-2624.
First Chinese Office Action, dated Nov. 9, 2015, issued in corresponding Chinese Application No. 201380055239.2, with English language translation.
Second Chinese Office Action, dated Jun. 2, 2016, issued in corresponding Chinese patent application No. 201380055239.2, with English language translation.
Third Chinese Office Action, dated Nov. 28, 2016, issued in corresponding Chinese patent application No. 201380055239.2, with English translation.
Du et al., "Graphene nanosheets as electrode material for electric double-layer capacitors", Electrochimica Acta, vol. 55, No. 16: pp. 4812-4819, Mar. 23, 2010.
Extended European Search Report, dated Apr. 29, 2016 in corresponding European patent application No. 13848707.9.
Schneider et al., "DNA translocation through graphene nanopores." Nano letters 10.8 (2010): 3163-3167.
Garaj et al., "Graphene as a subnanometre trans-electrode membrane", Nature [serial on the Internet]. (Sep. 9, 2010), [cited Jul. 13, 2017]; 467(7312): 190-193.
Merchant et al., "DNA translocation through graphene nanopores." Nano letters 10.8 (2010): 2915-2921.
Radich, James G., and Prashant V. Kamat. "Making graphene holey. Gold-nanoparticle-mediated hydroxyl radical attack on reduced graphine oxide." ACS nano 7.6 (2013); 5546-5557.

* cited by examiner

ULTRATHIN GRAPHENE PIECE, APPARATUS FOR PREPARING ULTRATHIN GRAPHENE PIECES, METHOD FOR PREPARING ULTRATHIN GRAPHENE PIECES, CAPACITOR, AND METHOD OF MANUFACTURING CAPACITOR

TECHNICAL FIELD

The present invention relates to an ultrathin graphene piece, an apparatus for preparing ultrathin graphene pieces, a method for preparing ultrathin graphene pieces, a capacitor, and a method of manufacturing capacitor.

In particular, the present invention relates to an apparatus for preparing ultrathin graphene pieces capable of preparing the ultrathin graphene piece, in which graphenes are continuously exfoliated from a graphite electrode and less than 10 pieces of graphene are overlapped, a method for preparing ultrathin graphene pieces, the ultrathin graphene piece in which less than 10 pieces of graphene are overlapped, a capacitor which uses the ultrathin graphene piece, and a method of manufacturing capacitor.

BACKGROUND ART

Graphene is an extremely thin sheet which has a thickness of one carbon atom, and has physical properties and characteristics which exceed those of the materials in the related art, such as high intensity, high conductivity, transparency, or a high thermal conductivity. In particular, the graphene has high transparency or high conductivity, and it is highly required that the graphene is used in a transparent electrode of a solar cell, a touch panel, or a capacitor.

In particular, capacitor performance is determined by an energy density and a charge and discharge rate which correspond to an energy storage capacity, and a power density which corresponds to an instantaneous output power. The energy density is proportional to a surface area of a capacitor electrode, and the power density depends on the conductivity. As illustrated in Table 1, the graphene has larger specific surface area and extremely excellent conductivity compared to activated carbon powder or a carbon nanotube. Accordingly, when the characteristics of the graphene is sufficiently used, it is possible to develop an electric double layer capacitor (super capacitor) having high performance which has not existed until now. For this reason, the graphene has been getting attention.

TABLE 1

| Electrode material | Specific surface area ($m^2/g$) | Conductivity (S/cm) |
| --- | --- | --- |
| Graphene | 2630 | $10^6$ |
| Activated carbon powder | 300-2200 | 300 |
| Carbon nanotube | 120-500 | $10^4$-$10^5$ |

Methods to preparing graphene are largely divided into a chemical vapor deposition (CVD) method and an exfoliation method.

A single-layered graphene sheet can be prepared by the CVD method. However, since the CVD method is a high-cost preparing method, the CVD method cannot be used for an industrial application.

The exfoliation method is a method for exfoliating the graphene from inexpensive graphite. Since mass production is possible at a low cost by the exfoliation method, the exfoliation method is appropriate for the industrial application. For this reason, in research and development for the application, the graphene prepared by exfoliation method is used.

As the exfoliation method, the following three types of methods are known.

The first method is a chemical exfoliation method, the second method is an organic solvent exfoliation method (NPL 1), and the third method is an electrolytic exfoliation method (PTL 1, NPL 2 to 6).

The chemical exfoliation method which is the first method is a general method for mass production of the graphene, and is a method for immersing graphite in which the graphene is multi-layered in a strong acid, making the graphite oxidized and expanded, exfoliating the multi-layered graphene as graphene oxide, and making the graphene by reducing the graphene oxide.

FIG. 1 is a view illustrating the chemical exfoliation method.

First, by oxidizing graphite powder in a concentrated sulfuric acid by using sodium nitrate and potassium permanganate, the graphene oxide is exfoliated. The surface of the exfoliated graphene oxide is modified by a carbonyl group, a carboxyl group, and a hydroxyl group.

Then, by performing partial reduction by using hydrazine, partially reduced graphene is made.

When the graphene oxide is partially reduced, the carbonyl group is removed, but the carboxyl group and the hydroxyl group remain. For this reason, conductivity or transparency of the graphene prepared by the reduction is not high. In addition, it is necessary to take a long time for an oxidation-reduction process. Furthermore, there are an environmental problem and a safety problem due to the strong acid or the hydrazine.

The organic solvent exfoliation method which is the second method is a method for immersing the graphite in an organic solvent of which surface tension is the same level as that of the graphene, and exfoliating the graphene by interaction with the organic solvent.

As the organic solvent which is used in the organic solvent exfoliation method and directly exfoliates the graphene from the graphite by immersing in liquid, several types of solvents may be used. Among these, the most general organic solvent is N-methylpyrrolidone (referred to as NMP).

First, after dispersing the graphite powder in NMP liquid, heating is performed for three days at 200° C. in an autoclave which is covered with Teflon (registered trademark). After this, by performing ultrasonic centrifugal separation processing, exfoliated graphene is obtained. The procedure is easier compared to that of the chemical exfoliation method, but there is a problem that productivity is low, and there are an environmental problem and a safety problem.

The electrolytic exfoliation method which is the third method is a method for using the graphite as an electrode, electrolyzing the graphite in an electrolytic solution, intercalating ions of the electrolytic solution between graphite layers, and exfoliating the graphene from the graphite electrode.

FIG. 2 is a schematic view of an apparatus which uses the electrolytic exfoliation method in the related art. The apparatus which uses the electrolytic exfoliation method is an extremely simple apparatus.

By using the apparatus, by using the graphite electrode as an anode and a platinum electrode as a cathode, a voltage which is approximately 10 V is applied between the two electrodes from a power source via wirings. Accordingly, the graphene is exfoliated from a surface of the graphite electrode, and as illustrated in FIG. 2, the graphene is aggregated on the electrode surface.

After this, these graphenes are detached from the surface of the graphite electrode, are released in the electrolytic solution, float in the electrolytic solution, and are precipitated.

FIG. 3 is a view illustrating a state of floating and precipitation in the electrolytic solution of the graphene which is electrolyzed and exfoliated.

As illustrated in FIG. 3, the graphene which is detached from the graphite electrode floats in the electrolyte liquid, and is further precipitated on the bottom.

Since modification of the carboxyl group or the like is small, the characteristics of the exfoliated graphene, such as conductivity or transparency, are excellent, and a defect or damage is also small.

The electrolytic exfoliation method is a method which can continuously prepare graphene having high performance in a short period of time, and can efficiently perform mass production at a low cost. Specifically, the electrolytic exfoliation method can prepare graphene in a shorter period of time which is equal to or less than one tenth of the time of the chemical exfoliation method. Since both the electrolytic exfoliation method and the chemical exfoliation method use the graphite as a raw material, and the apparatus thereof is inexpensive and simple, if the preparing procedure is managed mainly by preparing time, it is possible to calculate that the cost of the graphene which is prepared by the electrolytic exfoliation method is one tenth of the cost of the graphene which is prepared by the chemical exfoliation method.

For this reason, the electrolytic exfoliation method is the most desired method among the above-described three methods.

Meanwhile, in applying and employing the graphene, a thick graphene piece in which 10 or more graphenes are overlapped is not preferable, and a thin graphene piece in which less than 10 graphenes are overlapped is preferable. A thin graphene piece which is exfoliated to one single layer is more preferable. Accordingly, a method which can prepare a large quantity of thin graphene pieces in a short period of time is desired.

However, in the electrolytic exfoliation method in the related art, since the exfoliating of graphene is performed in a short period of time, intercalating of ions of the electrolytic solution is not sufficient, exfoliating of the graphene is not sufficient, and many graphenes are overlapped.

In other words, before the ions of the electrolytic solution between each layer of the graphene which constitutes the graphite electrode are sufficiently intercalated, the exfoliating is started. For this reason, the thick graphene piece in which 10 or more graphenes are overlapped is detached from the electrode, and now, a voltage is not applied to the thick graphene piece which is detached from the electrode any more. Accordingly, while a state where 10 or more graphenes are overlapped is maintained, the exfoliated thick graphene piece is released into the electrolytic solution, floats, and is precipitated. For this reason, finally, there is a problem that the thick graphene piece in which 10 or more graphenes are overlapped is collected. Furthermore, in a state where the thick graphene piece floats or is precipitated, a case where the graphenes are adhered again and recombined to each other, and return to the original graphite is also occurred.

In addition, in the application of the capacitor, in order to prevent the graphenes from being recombined and regenerated as the original graphite, a method which makes a spacer made of nanoparticles interpose between the graphenes is suggested (PTL 2 and 3).

In addition, NPL 3 to 5, and 7 to 10 are as follows.

NPL 3 relates to synthesis of graphene by electrochemical exfoliation.

NPL 4 relates to an electrode which is covered with a graphene nanosheet by the electrochemical exfoliation, and discloses an anode exfoliation method which uses a PSS solution.

NPL 5 relates to preparing of a graphene film by the electrochemical exfoliation, and discloses an anode exfoliation method which uses a sulfuric acid.

NPL 7 relates to a method for synthesizing the graphene by controlling a thickness by using an electrochemical process, and discloses an anode exfoliation method.

NPL 8 relates to preparing of the graphene by electrochemical intercalation to the graphite and ultrasound assist expansion, and discloses intercalation of $HClO_4$ and an ultrasonic irradiation method in an NMP solution. In FIG. 4, a thick graphene piece having 10 layers is disclosed.

NPL 9 relates to synthesis of graphene flake by electrochemical expansion of the graphite in propylene carbonate, and discloses a method for performing negative charging by $Li^+$/PC.

NPL 10 relates to graphitic platelets which are prepared by electrochemical exfoliation of the graphite, and discloses a method for discharging by $LiPF_6$/TMP. In FIG. 3, a substantially thick graphene piece is disclosed.

CITATION LIST

Patent Literature

[PTL 1] US2009/0026086A
[PTL 2] US2011/0165321A
[PTL 3] U.S. Pat. No. 7,623,340
[PTL 4] International Publication No. 2012/073998

Non Patent Literature

[NFL 1] Y Hernandez, V. Nicolasi, M. Lotya, F, M. Blighe, Z. Sun, S. De, I. T. McGovern, B. Holland, M. Byrne, Y. K. Gun'ko, J. J. Boland, P. Niraj, G. Duesberg, S. Krishnamurthy, R. Goodhue, J. Hutchison, V. Scardaci, A. C. Ferrari and J. N. Coleman, Nature Nanotechnology, 2008, 3, 563-568
[NPL 2] S.-K. Jeong, M, Inaba, Y. Iriyama, T. Abe and Z. Ogumi, Journal of Power Sources, 2008, 175, 540-546
[NFL 3] G. Wang, B. Wang, J. Park, Y. Wang, B. Sun and J. Yao, Carbon, 2009, 47, 3242-3246
[NPL 4] S-H. Lee, S-D. Seo, Y-H. Jin, H-W. Shim and D-W. Kim, Electrochemistry Communications, 2010, 12, 1419-1422
[NPL 5] C-Y. Su, A-Y. Lu, Y. Xu, F-R. Chen, A. N. Khlobystov and L-J. Li, AC Nano, 2011, 5, 2332-2339
[NPL 6] V. V. Singh, G. Gupta, A. Batra, A. K. Nigam, M. Boopathi, P. K. Gutch, B. K. Tripath, A. Srivastava, M. Samuel, G. S. Agarawal, B. Singh and R. Vijayaraghavan, Adv. Funct. Mater., 2012, 22, 2352-2362
[NFL 7] Murat Alanyaliog, Juan Jose Segura, Judith Oro-Sole, Nieves Casan-Pastor, Carbon, 50 (2012) 142-152
[NPL 8] G. M. Morales. P. Schifani, G. Ellis, C. Ballesteros, G. Martinez, C. Barbero, H. J. Salavagione, Carbon, 49(2011)2809-2816

[NPL 9] Junzong Wang, K. K. Manga, Q. Bao and K. P. Loh, J. Am. Chem. Soc., 2011, 133, 8888-8891

[NPL 10] H. F. Xiang, J. Y. Shi, X. Y. Feng, X. W. Ge, H. H. Wang, C. H. Chen, Electrochimica Acta, 56, 2011, 5322-5327

SUMMARY OF INVENTION

Technical Problem

The problem addressed by the present invention is to provide an apparatus for preparing ultrathin graphene pieces which can prepare a large quantity of ultrathin graphene pieces in which less than 10 pieces of graphene are overlapped, a method for preparing ultrathin graphene pieces capable of preparing the ultrathin graphene piece with high yield, an ultrathin graphene piece in which less than 10 pieces of graphene are overlapped, a capacitor having high performance by using the ultrathin graphene piece as an electrode, and an efficient method of manufacturing the capacitor.

Solution to Problem

In consideration of the above-described situation, the inventors have found that it is possible to continue to bond a thick graphene piece to an electrode even when the graphene piece is detached from a graphite electrode and a state where 10 or more graphenes are overlapped is maintained, and to continue to intercalate ions in an electrolytic solution with the graphene piece continuously, by attaching a porous filter to the graphite electrode, and as a result, it is possible to achieve intercalation of the ions of the electrolytic solution and electrolytic exfoliation between graphene layers to a maximum level, and to collect a large quantity of the ultrathin graphene pieces, including single-layered graphene, in which less than 10 pieces of graphene are overlapped, in particular, the single-layered graphenes, with high yield. In addition, the inventors have found that it is possible to make an apparent specific surface area of the graphene pieces close to a theoretical specific surface area by reducing the number of overlapped graphenes. In addition, the inventors have found that it is possible to perform activation processing for forming a hole(s) (nanobore), and to improve activity of graphene, by applying a constant voltage to the thin graphene piece. In addition, the inventors have found that it is possible to remove modifying molecules which remain on a surface of graphene, and to further improve activity of the surface of graphene, by applying a voltage in a reverse direction after the activation processing. The present invention is completed by founding that specific capacitance increases when powder comprising the ultrathin graphene piece and/or the activated ultrathin graphene piece is used as a material of a capacitor.

The present invention is configured as follows.

(1) An apparatus for preparing ultrathin graphene pieces, comprising: a graphite electrode; a counter electrode which is made of graphite, a corrosion resistant alloy, or a precious metal; an electrolytic solution in which one end sides of the two electrodes are immersed; a container which stores the electrolytic solution; and a power source which is connected to the two electrodes via wirings, in which a porous filter is provided so as to cover at least the immersed part of the graphite electrode that is immersed in the electrolytic solution.

(2) The apparatus for preparing ultrathin graphene pieces according to (1), in which the graphite electrode is made of natural graphite or highly oriented pyrolytic graphite (HOPG).

(3) The apparatus for preparing ultrathin graphene pieces according to (1), in which the counter electrode which is made of a precious metal is a platinum sheet.

(4) The apparatus for preparing ultrathin graphene pieces according to (1), in which the electrolytic solution is an acid aqueous solution or an organic solvent.

(5) The apparatus for preparing ultrathin graphene pieces according to (4), in which the acid aqueous solution is any of aqueous solutions of a sulfuric acid, a hydrochloric acid, and a nitric acid.

(6) The apparatus for preparing ultrathin graphene pieces according to (4), in which the organic solvent is polypropylene carbonate to which 1 M of $LiPF_6$ is added.

(7) The apparatus for preparing ultrathin graphene pieces according to (1), in which the porous filter is a filter paper.

(8) A method for preparing ultrathin graphene pieces, in which the apparatus for preparing ultrathin graphene pieces according to (1) is used, in which a graphite electrode is used as an anode and a counter electrode is used as a cathode, and in which a voltage is applied between the electrodes.

(9) The method for preparing ultrathin graphene pieces according to (8), in which a first voltage applying step of applying a voltage which is +0.1 V to +10 V between the electrodes for 1 minute to 10 minutes, a second voltage applying step of applying a voltage which is +1 V to +10 V between the electrodes for 1 minute to 10 minutes, and a third voltage applying step of applying a voltage which is +5 V to +15 V between the electrodes for 1 hour to 2 hours, are sequentially performed.

(10) The method for preparing ultrathin graphene pieces according to (9), in which the method comprising, after the third voltage applying step, an organic solvent dispersion step of dispersing powder which is obtained by filtering, washing, and drying the electrolytic solution in an organic solvent, and irradiating ultrasonic waves.

(11) The method for preparing ultrathin graphene pieces according to (10), in which the organic solvent is any of N-methylpyrrolidone (NMP), dimethylformamide (DMF), N,N-Dimethylacetamide (DMA), γ-buthyrolactone (GBL), or 1,3-dimethyl-2-imidazolidinone (DMEU).

(12) The method for preparing ultrathin graphene pieces according to (9), in which the method comprising, after the third voltage applying step, an activation processing step of applying a voltage which is +5 V to +15 V between the electrodes for 60 minutes to 120 minutes.

(13) The method for preparing ultrathin graphene pieces according to (12), in which the method comprising, after the activation processing step, a modifying molecule removing step of applying a voltage in a reverse direction with the same value of the voltage applied in the activation processing step.

(14) The method for preparing ultrathin graphene pieces according to (13), in which an operation which includes the activation processing step and the modifying molecule removing step is repeated two or more times.

(15) An ultrathin graphene piece, in which less than 10 pieces of graphene are overlapped.

(16) The ultrathin graphene piece according to (15), in which a hole(s) is formed in the graphene.

(17) The ultrathin graphene piece according to (16), in which the diameter of the hole is 1 nm to 20 nm.

(18) The ultrathin graphene piece according to any one of (15) to (17), in which modifying molecules of any of a carbonyl group, a carboxyl group, or a hydroxyl group are not bound to the graphene.

(19) A capacitor, comprising: two electrodes; and electrolytic solution impregnated layer which is disposed between the electrodes, in which the electrodes are electrodes which are made by molding powder comprising the ultrathin graphene piece according to any one of (15) to (18) in a plate shape.

(20) The capacitor according to (19), in which a carbon nanotube is dispersed in the electrodes.

(21) A method of manufacturing capacitor, comprising: molding powder comprising the ultrathin graphene piece according to any one of (15) to (18) by filtering, washing, and drying a solution, in which the powder comprising the ultrathin graphene piece is dispersed, in a plate shape; and manufacturing a capacitor by using the plate-shaped powder comprising the ultrathin graphene piece as an electrode.

(22) The method of manufacturing capacitor according to (21), in which, in the step of molding the powder comprising the ultrathin graphene piece in a plate shape, a carbon nanotube is dispersed in the solution.

Advantageous Effects of Invention

An apparatus for preparing ultrathin graphene pieces of the present invention comprises: a graphite electrode; a counter electrode which is made of graphite, a corrosion resistant alloy, or a precious metal; an electrolytic solution in which one end sides of the two electrodes are immersed; a container which stores the electrolytic solution; and a power source which is connected to the two electrodes via wirings, and a porous filter is provided so as to cover at least the immersed part of the graphite electrode that is immersed in the electrolytic solution. For this reason, the electrolytic solution can flow in and out via pore of the porous filter. However, it is possible to make many thick graphene pieces into the ultrathin graphene piece in which less than 10 pieces of graphene are overlapped by holding the thick graphene piece which is detached from the graphite electrode in the porous filter without allowing the thick graphene piece which is detached from the graphite electrode to flow in and out, and by continuing to bring the thick graphene piece into contact with the graphite electrode.

In a method for preparing ultrathin graphene pieces of the present invention, the apparatus for preparing ultrathin graphene pieces which is described above is used, the graphite electrode is used as an anode and the counter electrode is used as a cathode, and a voltage is applied between the electrodes. For this reason, the electrolytic solution can flow in and out via pore of the porous filter. However, it is possible to continue to apply a voltage to the thick graphene piece by holding the thick graphene piece which is detached from the graphite electrode in the porous filter without allowing the thick graphene piece which is detached from the graphite electrode to flow in and out, and by continuing to bring the thick graphene piece into contact with the graphene electrode, and to make many thick graphene pieces into the ultrathin graphene piece in which less than 10 pieces of graphene are overlapped. Powder in which a ratio of the ultrathin graphene piece is high can be made.

In an ultrathin graphene piece of the present invention, less than 10 pieces of graphene are overlapped. For this reason, it is possible to increase a specific surface area per unit mass, and to improve capacitor performance when the ultrathin graphene piece is molded in a plate shape and used as an electrode.

In the ultrathin graphene piece of the present invention, a hole(s) is formed in the graphene. For this reason, it is possible to further increase a specific surface area per unit mass, to make an activated ultrathin graphene piece in which specific capacitance can be increased when the ultrathin graphene piece is used as a material of the capacitor, and by using this, to improve capacitor performance.

In the ultrathin graphene piece of the invention, modifying molecules of any of a carbonyl group, a carboxyl group, or a hydroxyl group are not bound to the graphene. For this reason, it is possible to improve activity of a surface of graphene, to make the activated ultrathin graphene piece in which specific capacitance can be increased when the ultrathin graphene piece is used as a material of the capacitor, and by using this, to improve capacitor performance.

A capacitor of the present invention comprises: two electrodes; and electrolytic solution impregnated layer which is disposed between the electrodes, and the electrode is an electrode which is made by molding powder comprising the ultrathin graphene piece described above in a plate shape. For this reason, it is possible to make a capacitor having high performance.

By using the powder in which the ratio of the ultrathin graphene piece described above is high, it is possible to further improve capacitor performance.

A method of manufacturing capacitor of the present invention, comprises: a step of molding powder comprising the ultrathin graphene piece described above by filtering, washing, and drying a solution, in which the powder comprising the ultrathin graphene piece is dispersed, in a plate shape; and a step of manufacturing a capacitor by using the plate-shaped powder comprising the ultrathin graphene piece as an electrode. For this reason, it is possible to easily prepare a capacitor having high performance.

DESCRIPTION OF EMBODIMENTS

Embodiment of Present Invention

Hereinafter, with reference to the attached drawings, an apparatus for preparing ultrathin graphene pieces, a method for preparing ultrathin graphene pieces, an ultrathin graphene piece, a capacitor, and a method of manufacturing capacitor according to an embodiment of the present invention will be described.

Ultrathin Graphene Piece

First, the ultrathin graphene piece according to the embodiment of the present invention will be described.

Figure 1:
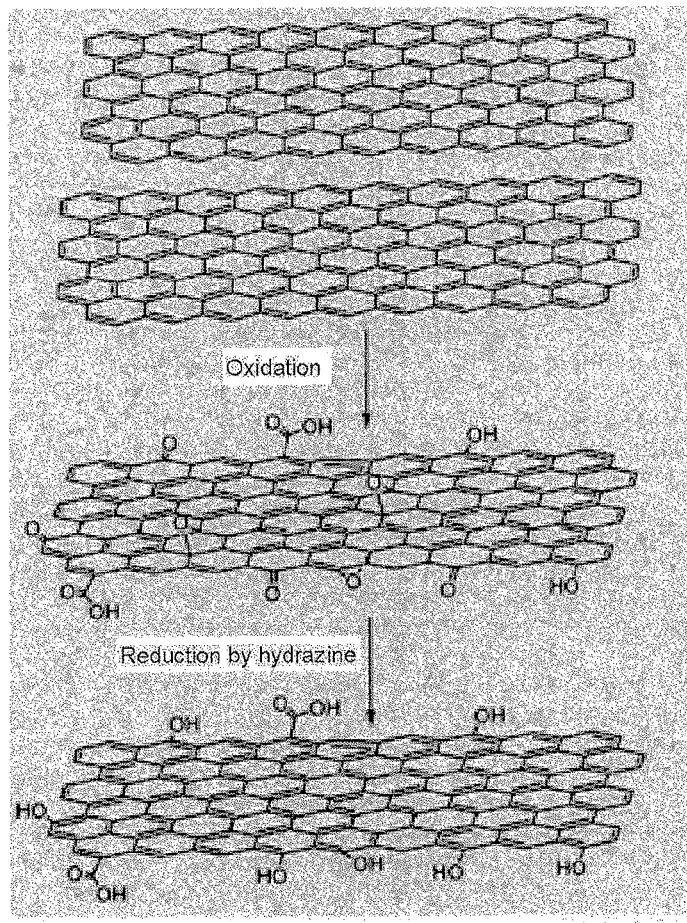
FIG. 1 is a view illustrating a chemical exfoliation method.
Figure 2:
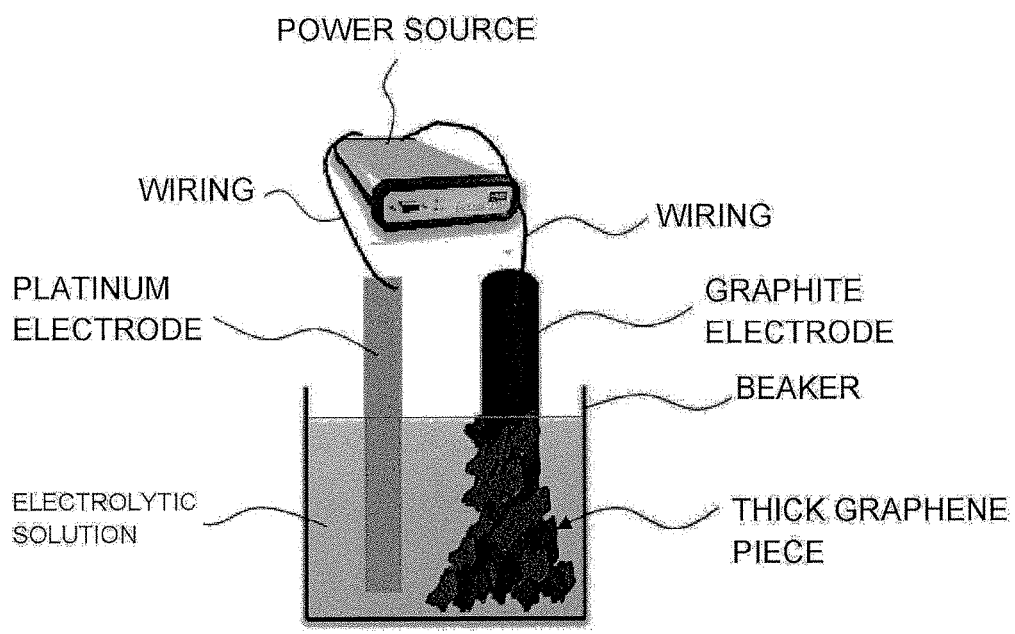
FIG. 2 is a schematic view of a device which uses an electrolytic exfoliation method in the related art.
Figure 3:
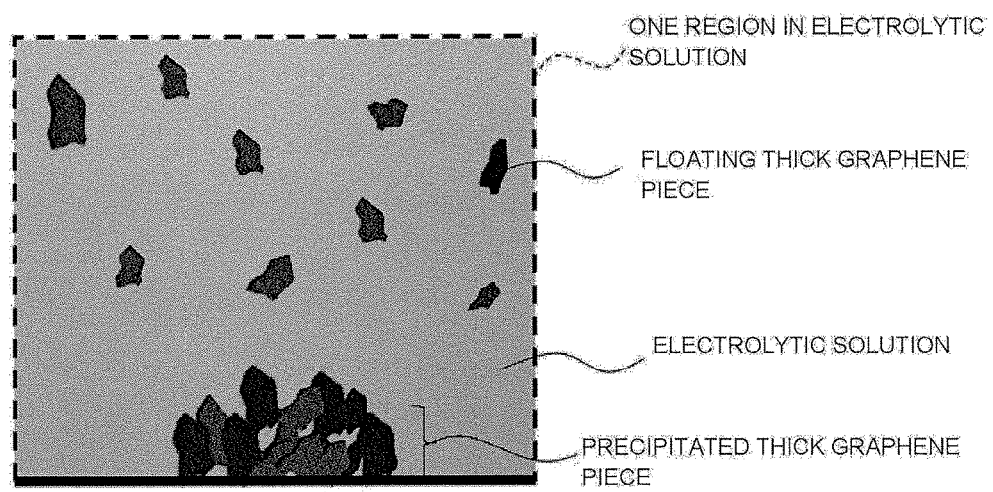
FIG. 3 is a view illustrating a state of floating and precipitation in the electrolytic solution of the graphene prepared by electrolytic exfoliation.
Figure 4:
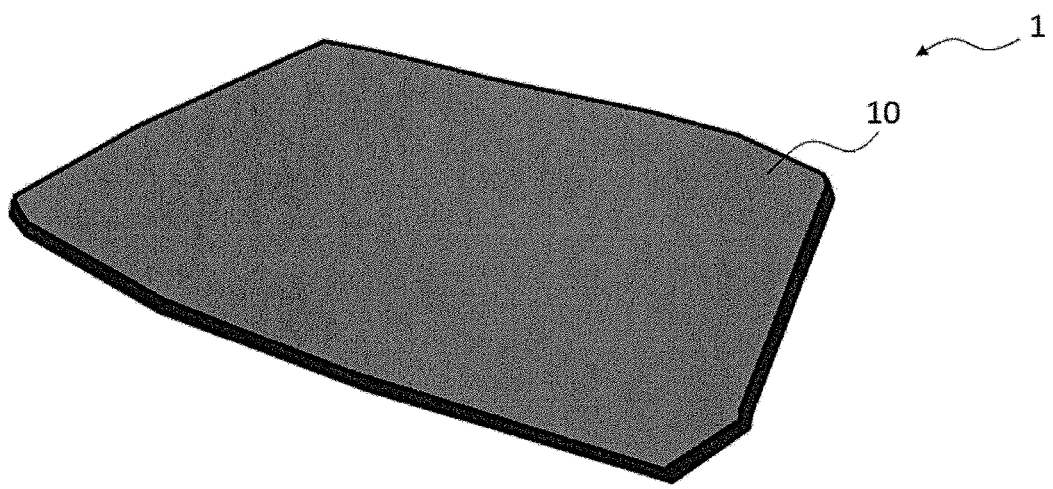
FIG. 4 is a schematic view illustrating an example of an ultrathin graphene piece according to an embodiment of the present invention.

FIG. 4 is a schematic view illustrating an example of the ultrathin graphene piece according to an embodiment of the present invention.

As illustrated in FIG. 4, an ultrathin graphene piece 1 according to the embodiment of the present invention is configured of one piece of graphene 10.

Modifying molecules of any of a carbonyl group, a carboxyl group, or a hydroxyl group are not bound to a surface of the graphene 10. Accordingly, it is possible to improve activity of the surface of the graphene, and to improve characteristics of a capacitor, such as capacitance, when the graphene is aggregated and used as an electrode substrate of the capacitor.

In addition, a single-layered graphene (one piece of graphene) has the highest level of a specific surface area per unit mass, therefore it is possible to improve characteristics of the capacitor.

Figure 5:
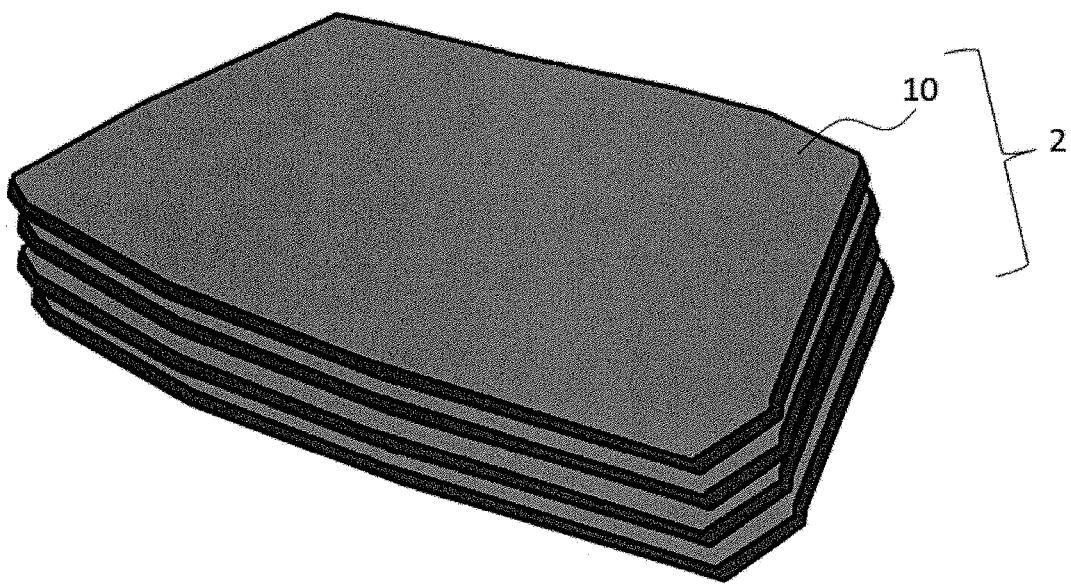
FIG. 5 is a schematic view illustrating another example of the ultrathin graphene piece according to the embodiment of the present invention.

FIG. 5 is a schematic view illustrating another example of the ultrathin graphene piece according to the embodiment of the present invention.

As illustrated in FIG. 5, in an ultrathin graphene piece 2 according to the embodiment of the present invention, four pieces of graphene 10 are overlapped.

The ultrathin graphene piece 2 according to the embodiment of the present invention is a stacked body which is configured of a plurality of graphenes, and the number of the overlapped graphenes is less than 10. Accordingly, it is possible to increase the specific surface area per unit mass, for example, per one gram, and to improve characteristics of the capacitor, such as capacitance, when the graphene is aggregated and used as the electrode substrate of the capacitor. When the number of the overlapped graphenes is equal to or greater than 10, the effect of improving characteristics of the capacitor is small.

The number of the overlapped graphenes is less than 10. However, a small number of the overlapped graphenes is preferable, equal to or less than 4 is more preferable, equal to or less than 2 is still more preferable, and 1 is particularly preferable. In addition, when the number of the overlapped graphene is 1, the ultrathin graphene piece is configured of a single-layered graphene as illustrated in FIG. 4.

Sizes of each of the overlapped graphenes may be the same as each other or may be different from each other.

Figure 6:
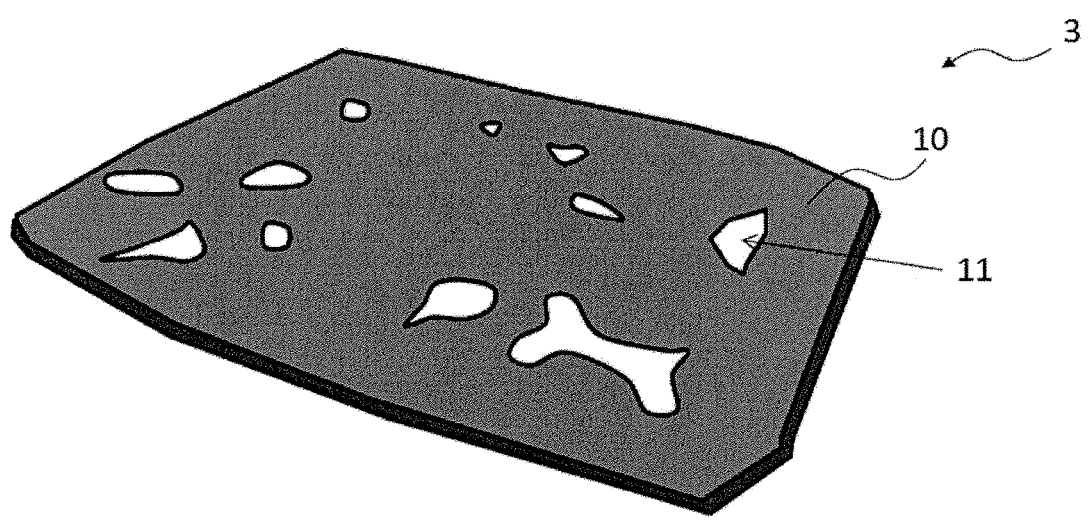
FIG. 6 is a schematic view illustrating another example of the ultrathin graphene piece according to the embodiment of the present invention.

FIG. 6 is a schematic view illustrating another example of the ultrathin graphene piece according to the embodiment of the present invention.

As illustrated in FIG. 6, in an ultrathin graphene piece 3 according to the embodiment of the present invention, a hole (also referred to as a nanobore) 11 is formed on the surface of the graphene 10. By the hole (nanobore), it is possible to improve activity of the surface of the graphene, and to further improve characteristics of the capacitor, such as capacitance, when the graphene is aggregated and used as the electrode substrate of the capacitor.

It is preferable that the diameter of the hole 11 is 1 nm to 20 nm. Accordingly, it is possible to improve activity of the surface of the graphene. Here, the diameter of the hole 11 means the maximum diameter. The diameter of the hole 11 can be confirmed from an electron microscope image.

At least one hole 11 may be formed, but it is preferable that a plurality of holes 11 are formed with high density. In addition, the hole 11 may be a through hole which penetrates front and rear sides of the ultrathin graphene piece 3.

In addition, when the plurality of graphenes are overlapped, it is preferable that the holes 11 are formed in all of the graphenes. Accordingly, it is possible to enhance an effect of improving characteristics of the capacitor.

When the number of the overlapped graphenes is equal to or greater than 2, it is preferable that the hole 11 is formed to communicate between different graphenes. Accordingly, it is possible to make a flow of ions to the surface of the graphene easy, and to make reaction on the surface of the graphene active.

Figure 7:
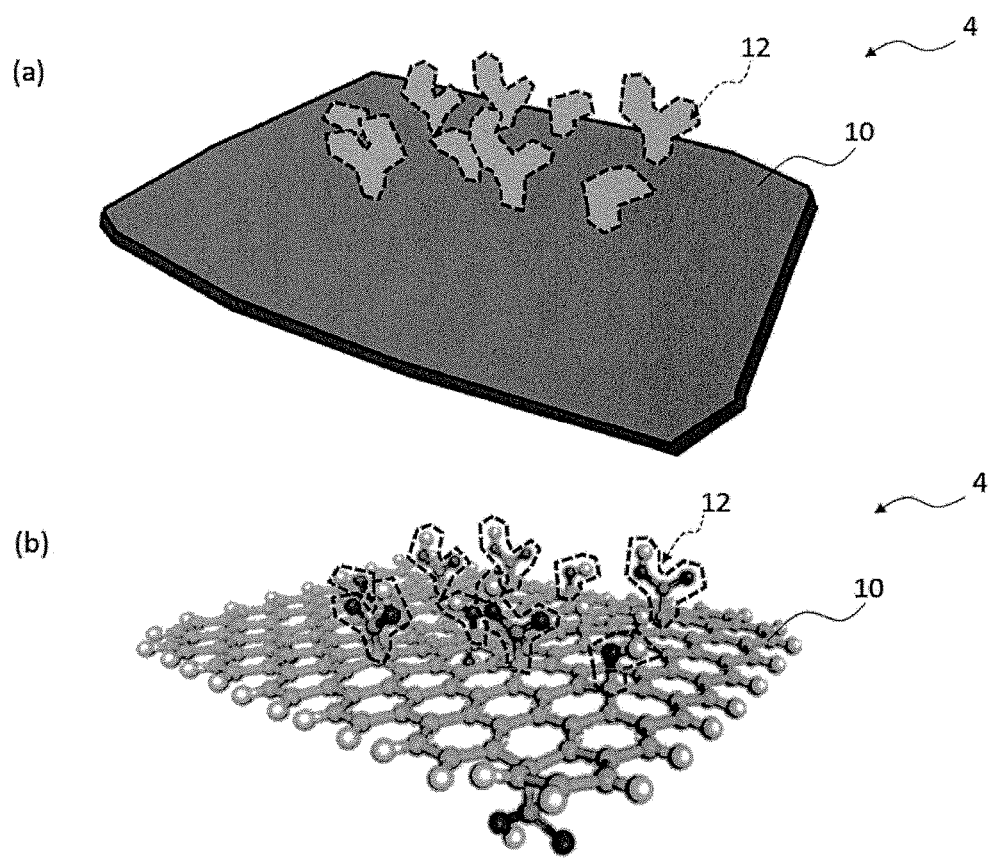
FIG. 7 is a view illustrating another example of the ultrathin graphene piece according to the embodiment of the present invention.

FIG. 7 is a view illustrating another example of the ultrathin graphene piece according to the embodiment of the present invention. FIG. 7(a) is a schematic view, and FIG. 7(b) is a view of a ball-and-stick molecular structure.

As illustrated in FIG. 7, in an ultrathin graphene piece 4 according to the embodiment of the present invention, modifying molecules 12 of any of a carbonyl group, a carboxyl group, or a hydroxyl group are bound to the surface of the graphene 10. In this configuration, activity of the surface of the graphene is maintained at a certain level, and it is also possible to improve characteristics of the capacitor, such as capacitance, when the graphene is aggregated and used as the electrode substrate of the capacitor.

Figure 8:
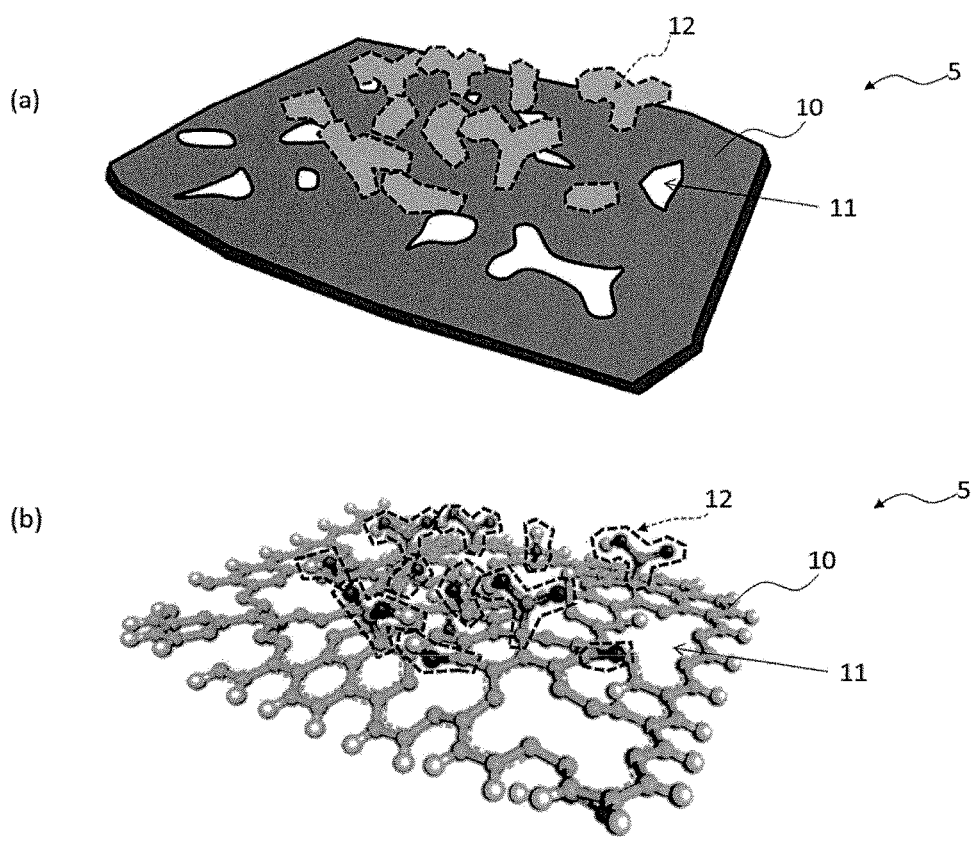
FIG. 8 is a view illustrating still another example of the ultrathin graphene piece according to the embodiment of the present invention.

FIG. 8 is a view illustrating still another example of the ultrathin graphene piece according to the embodiment of the present invention. FIG. 8(a) is a schematic view, and FIG. 8(b) is a ball-and-stick molecular structure.

As illustrated in FIG. 8, in an ultrathin graphene piece 5 according to the embodiment of the present invention, the modifying molecules 12 of any of a carbonyl group, a carboxyl group, or a hydroxyl group are bound to the surface of the graphene 10, and the hole 11 is formed. In this configuration, it is also possible to improve activity of the surface of the graphene, and to improve characteristics of the capacitor, such as capacitance, when the graphene is aggregated and used as the electrode substrate of the capacitor.

In FIGS. 6 to 8, only the ultrathin graphene piece which is made of a single-layered graphene is illustrated as an example, but each example may have a configuration in which less than 10 graphenes are overlapped.

In addition, when the number of the overlapped graphenes is less than 10, not only a configuration in which only the graphene 10 is provided, but also an ultrathin graphene which is arbitrarily combined by a graphene to which the modifying molecules 12 are not bound and in which the hole 11 is also not formed, a graphene to which only the modifying molecules 12 are bound, a graphene in which only the hole 11 is formed, and a graphene to which the modifying molecules 12 are bound and in which the hole 11 is formed, may be employed.

Apparatus for Preparing Ultrathin Graphene Pieces

Next, an apparatus for preparing ultrathin graphene pieces according to the embodiment of the present invention will be described.

Figure 9:
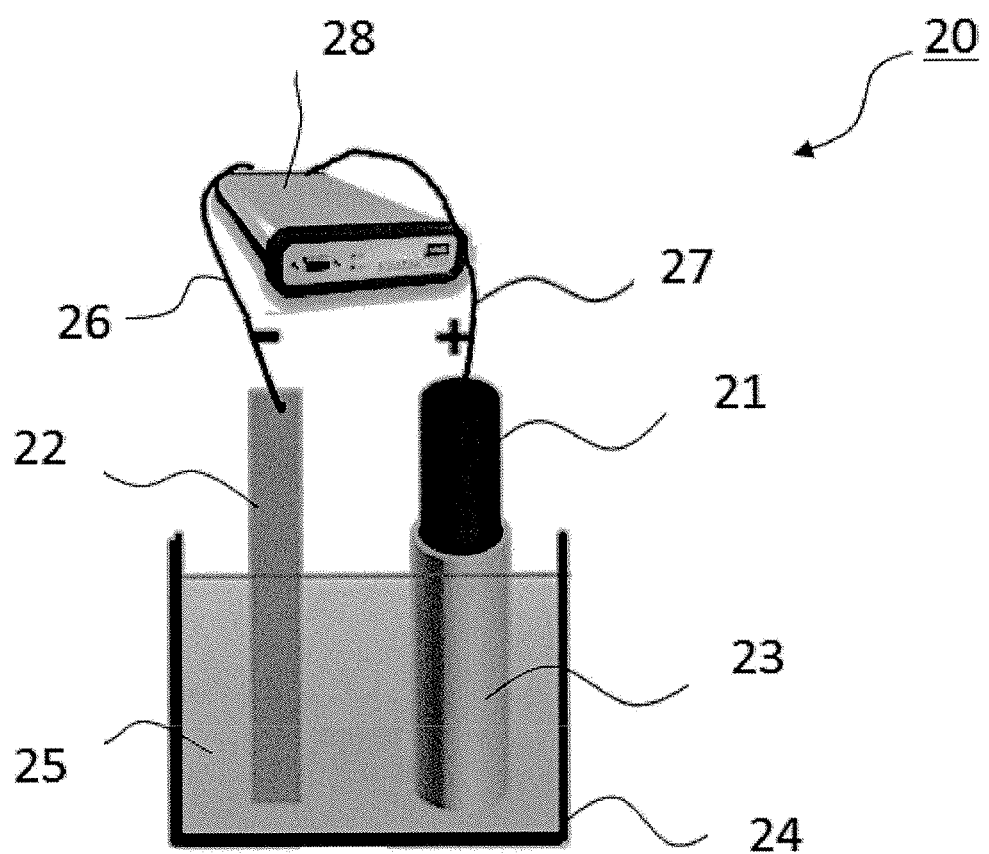
FIG. 9 is a schematic view illustrating an example of an apparatus for preparing ultrathin graphene pieces according to the embodiment of the present invention.

FIG. 9 is a schematic view illustrating an example of the apparatus for preparing ultrathin graphene pieces according to the embodiment of the present invention.

As illustrated in FIG. 9, an apparatus 20 for preparing ultrathin graphene pieces according to the embodiment of the present invention comprises a graphite electrode 21, a counter electrode 22, an electrolytic solution 25 in which one end sides of the two electrodes 21 and 22 are immersed, a container 24 which stores the electrolytic solution 25, and a power source 28 which is connected to the two electrodes 21 and 22 via wirings 26 and 27.

In addition, in the apparatus 20 for preparing ultrathin graphene pieces according to the embodiment of the present invention, a porous filter 23 is provided so as to cover at least the immersed part of the graphite electrode 21 that is immersed in the electrolytic solution 25. The porous filter 23 is formed by linking plural pores, and the electrolytic solution 25 can flow in and out through the porous filter 23. Therefore, when the graphite electrode 21 is immersed in the electrolytic solution 25, a surface of the graphite electrode 21 which is covered with the porous filter 23 is in a state of coming into contact with the electrolytic solution 25 which flows in through the porous filter 23.

As the porous filter 23 which is provided so as to cover at least the immersed part of the graphite electrode 21 which is immersed in the electrolytic solution 25, even when a thick graphene piece is exfoliated from the graphite electrode while a state where several graphenes are overlapped is maintained, the thick graphene piece is held and accumulated in the porous filter 23. Accordingly, the thick graphene piece in the electrolytic solution 25 which is stored in the container 24 is prevented from flowing out, and floating and precipitation of the thick graphene piece in the electrolytic solution 25 are reduced. Since the thick graphene piece which is accumulated inside the porous filter 23 is in a state of coming into contact with the surface of the graphite electrode 21, it is possible to continue to intercalate ions of the electrolytic solution 25 with the graphene piece continuously, and as a result, to achieve intercalation of ions of the electrolytic solution and electrolytic exfoliation between graphene layers to a maximum level. In this manner, it is possible to continuously occur electrolytic exfoliation of the graphene, and to collect a large quantity of ultrathin graphene pieces, including the single-layered graphene, in which less than 10 pieces of graphene are overlapped, with high yield. In particular, it is possible to obtain a single-layered graphene in which the number of graphene is 1, with high yield.

By controlling reaction time, it is possible to obtain powder of the graphene comprising at least equal to or greater than 50% by mass of ultrathin graphene piece in which less than 10 pieces of graphene are overlapped.

It is preferable that the maximum pore diameter of the porous filter 23 is 0.05 μm to 5 μm. 0.1 μm to 1 μm is more preferable, and 0.15 μm to 0.5 μm is still more preferable.

Accordingly, it is possible to further effectively make the electrolytic solution flow in and out of the surface of the graphite electrode via the porous filter 23, and to make a large number of ions in the electrolytic solution 25 flow in and out of the surface of the graphite electrode. In addition, it is possible to continue to perform further effective continuous intercalation between the layers of the graphene of the graphite electrode, and to collect the ultrathin graphene piece, including the single-layered graphene, in which less than 10 pieces of graphene are overlapped, with further higher yield.

It is preferable that the graphite electrode 21 is made of natural graphite or highly oriented pyrolytic graphite (HOPG). Accordingly, it is possible to efficiently prepare a large quantity of ultrathin graphene pieces which are made of less than 10 pieces of graphene.

The counter electrode 22 is made of graphite, corrosion resistant alloy, or a precious metal. Accordingly, it is possible to efficiently apply a voltage between the two electrodes by using the graphite electrode 21 as an anode and the counter electrode 22 as a cathode.

Example of the counter electrode 52 which is made of a precious metal, can include a platinum sheet.

It is preferable that the electrolytic solution 25 is an acid aqueous solution, an organic solvent, or ion liquid. Accordingly, it is possible to easily perform exfoliating by intercalating any of an acid, organic molecules, and ions, between the layers of the graphene.

Examples of the acid aqueous solution can include any aqueous solutions of a sulfuric acid, a hydrochloric acid, and a nitric acid. When a diluted sulfuric acid is used, it is possible to intercalate $SO_2$ ions.

Figure 10:
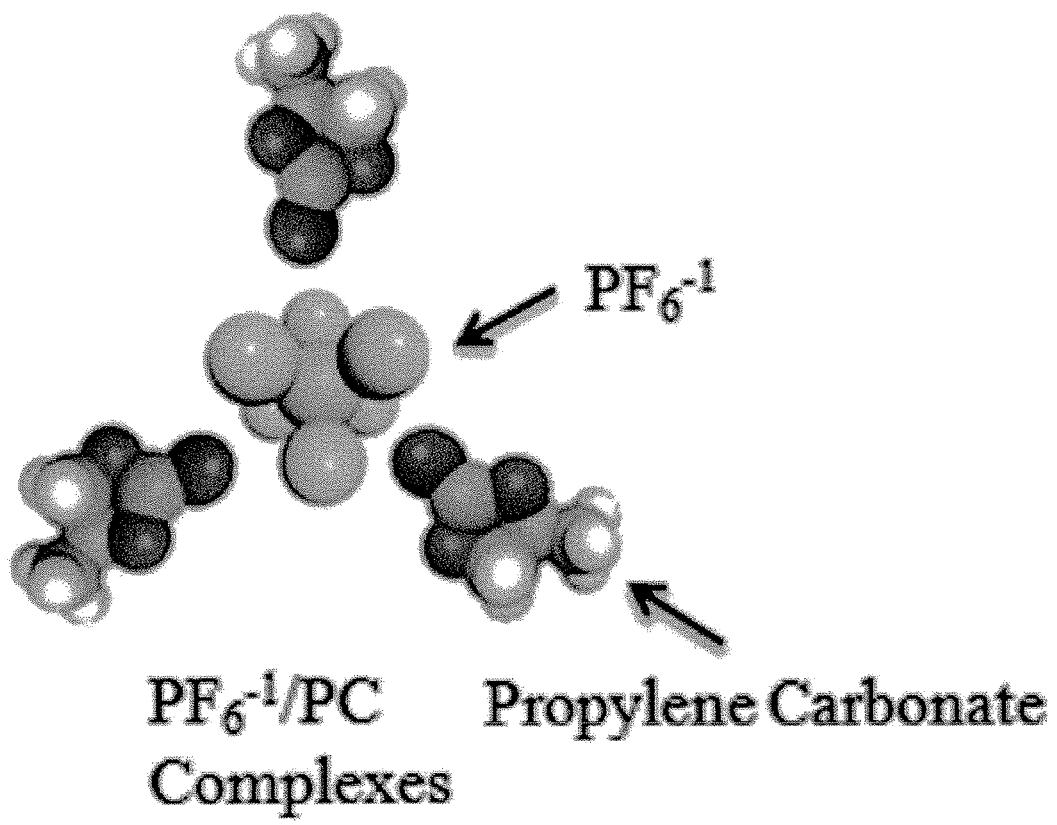
FIG. 10 is a schematic view of a $PF_6^{-1}/PC$ complex.

In addition, example of the organic solvent can include polypropylene carbonate (PC) to which 1 M of $LiPF_6$ is added. In this solution, $PF_6^{-1}$/PC complex illustrated in FIG. 10 is formed.

Figure 11:
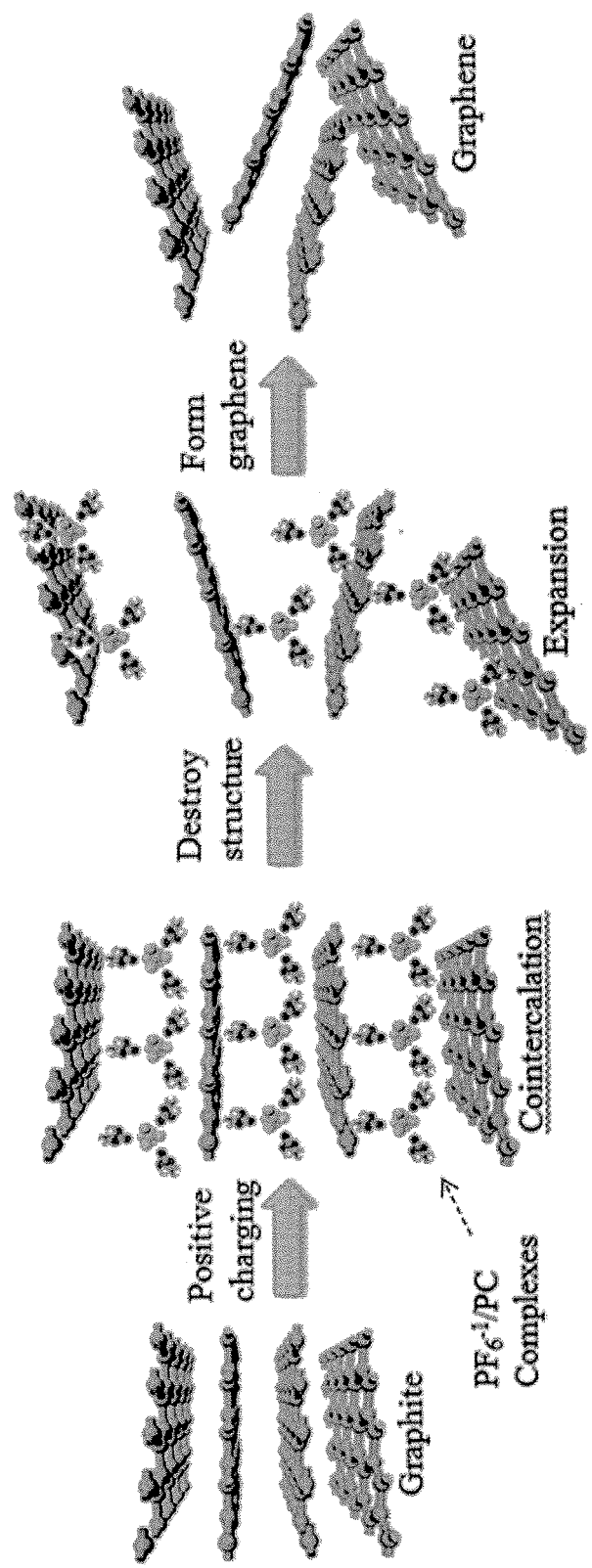
FIG. 11 is a view illustrating a step of preparing graphene by destroying and expanding a layer structure after the $PF_6^{-1}$/PC complex is intercalated between graphite layers by positive charging.

As illustrated in FIG. 11, this complex is intercalated between the layers of the graphite by positive charging. After this, a layer structure is destroyed and expanded. Then, the graphene is prepared. In this manner, the polypropylene carbonate to which 1 M of $LiPF_6$ is added is particularly preferable since it is possible to efficiently perform the exfoliating process.

Examples of the porous filter 23 can include a filter paper or a glass fiber filter. Example of the filter paper can include filter paper Millipore having 0.22 μm of the pore size which is manufactured by Whatman.

The porous filter 23 which is made of the filter paper is wound around and fixed to the graphite electrode 21, for example. Even in a case of a shape of a bag, a cylindrical shape of which one end side is closed may be employed.

Method for Preparing Ultrathin Graphene Pieces

Next, a method for preparing ultrathin graphene pieces according to the embodiment of the present invention will be described.

The method for preparing ultrathin graphene pieces according to the embodiment of the present invention is a method for preparing the ultrathin graphene piece, in which the apparatus 20 for preparing graphene pieces is used, the graphite electrode 21 is used as an anode and the counter electrode 22 is used as a cathode, and a voltage is applied between the electrodes 21 and 22.

Specifically, the graphite electrode and the counter electrode which is made of graphite, a corrosion resistant alloy, or a precious metal are prepared, and one end sides of these electrodes are immersed in the electrolytic solution. Here, an immersed part of the graphite electrode which is immersed in the electrolytic solution is covered with the porous filter. Next, by using the graphite electrode as an anode and the counter electrode as a cathode, a voltage is applied between the electrodes.

When the voltage is applied between the electrodes, it is preferable to prepare the ultrathin graphene piece by sequentially performing a first voltage applying step of applying a voltage which is +0.1 V to +10 V between the electrodes for 1 minute to 10 minutes, a second voltage applying step of applying a voltage which is +1 V to +10 V between the electrodes for 1 minute to 10 minutes, and a third voltage applying step of applying a voltage which is +5 V to +15 V between the electrodes for 1 hour to 2 hours.

In the first voltage applying step, electrolytic exfoliation is not occurred. However, by performing the first voltage applying step, it is possible to move the ions or the like which are intercalated between the graphite layers to a crystal grain boundary of graphite. Accordingly, it is possible to efficiently perform electrolytic exfoliation in the following step.

For example, in the first voltage applying step, +1 V is applied for 10 minutes.

In the second voltage applying step, electrolytic exfoliation is performed. By performing the second voltage applying step, the graphene is exfoliated from the graphite electrode (anode). The exfoliated graphene is accumulated in the porous filter, and held in a state of coming into contact with the graphite electrode.

The exfoliating speed is controlled by managing a voltage value.

In the third second voltage applying step, regarding the graphene which is prepared by electrolytic exfoliation in the second voltage applying step, it is possible to reduce the number of overlapped graphenes by further exfoliating the thick graphene piece in which interlayer exfoliation of the graphenes is not sufficient and the number of overlapped graphenes is large. Accordingly, it is possible to form an ultrathin graphene piece in which less than 10 pieces of graphene are overlapped, with high yield.

By performing electrolytic exfoliation described above, for example, a volume of the electrode increases by approximately 20%.

Figure 12:
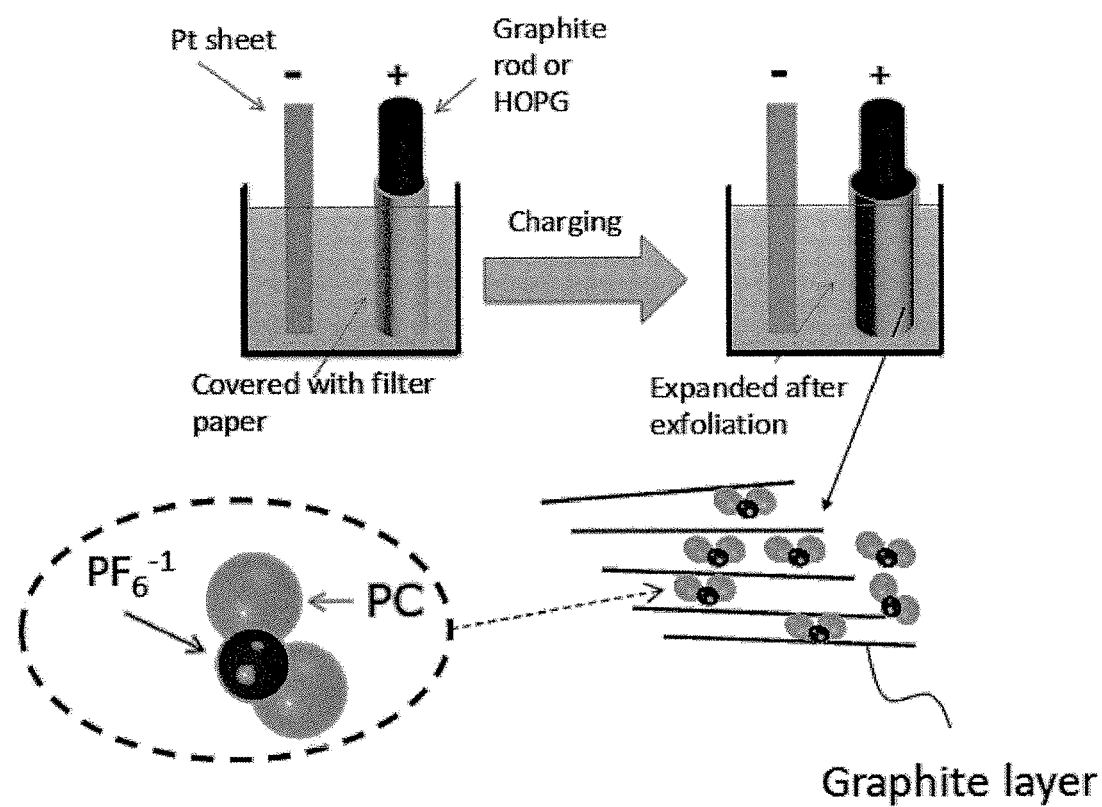
FIG. 12 is a schematic view illustrating an example of a case where a volume of an electrode increases by charging.

FIG. 12 is a schematic view illustrating an example of a case where the volume of the electrode increases by charging. A state where the organic molecules are intercalated between the layers of graphene is combined and illustrated.

After the third voltage applying step, the porous filter is removed from the graphite electrode, an aggregates which floats in the electrolytic solution is eliminated, and the electrolytic solution in which the ultrathin graphene piece is dispersed is obtained. It is preferable that an organic solvent dispersion step of dispersing powder which is obtained by filtering, washing, and drying the electrolytic solution in an organic solvent, and irradiating ultrasonic waves is performed. The organic solvent dispersion step may be performed after an activation processing step which will be described later, and may be performed after a modifying molecule removing step which will be described later.

It is known that the organic solvent of which surface tension is approximately 40 $mJ/m^2$ exfoliates graphene from graphite which is immersed in the organic solvent.

It is possible to further exfoliate the thick graphene piece in which the number of overlapped graphenes is large by exfoliating graphene by the organic solvent, to make the number of overlapped graphenes small, and to increase a ratio of one single-layered graphene. Accordingly, it is possible to form the ultrathin graphene piece in which less than 10 pieces of graphene are overlapped, with high yield.

Examples of the organic solvent can include any of N-methylpyrrolidone (NMP), dimethylformamide (DMF), N,N-Dimethylacetamide (DMA), γ-buthyrolactone (GBL), or 1,3-dimethyl-2-imidazolidinone (DMEU).

After the third voltage applying step or the organic solvent dispersion step, it is preferable that the activation processing step of applying a voltage which is +5 V to +15 V between the electrodes for 60 minutes to 120 minutes is performed. Accordingly, it is possible to form the hole (nanobore) on the surface of the graphene. By forming the hole, it is possible to improve activity of the surface of the graphene. Accordingly, it is possible to make the number of overlapped graphenes less than 10, to form the hole, and to form the activated ultrathin graphene piece, with high yield.

After the activation processing step, it is preferable that the modifying molecule removing step of applying a voltage in a reverse direction with the same value of the voltage applied in the activation processing step is performed. Here, the "voltage in a reverse direction" means difference of positive and negative of a voltage value. For example, when +10 V is applied in the activation processing step, in the modifying molecule removing step, −10 V is applied. By performing the modifying molecule removing step, it is possible to reduce and remove the modifying molecules which remain on the surface of the graphene, and to improve activity of the surface of the graphene. By removing the modifying molecules on the surface of the graphene, it is possible to improve conductivity of the graphene. Accordingly, it is possible to make the number of overlapped graphenes less than 10, to form the hole, to remove the modifying molecules, and to form the activated ultrathin graphene piece with high yield. Time for applying the voltage in the modifying molecule removing step may be the same as or may be different from the time for applying the voltage applied in the activation processing step.

It is preferable that an operation which includes the activation processing step and the modifying molecule removing step is repeated two or more times. Accordingly, it is possible to form more holes, and to fully remove the modifying molecules. Accordingly, it is possible to make the number of overlapped graphenes less than 10, to form the hole, to remove the modifying molecules, and to form the activated ultrathin graphene piece with high yield.

Figure 13:
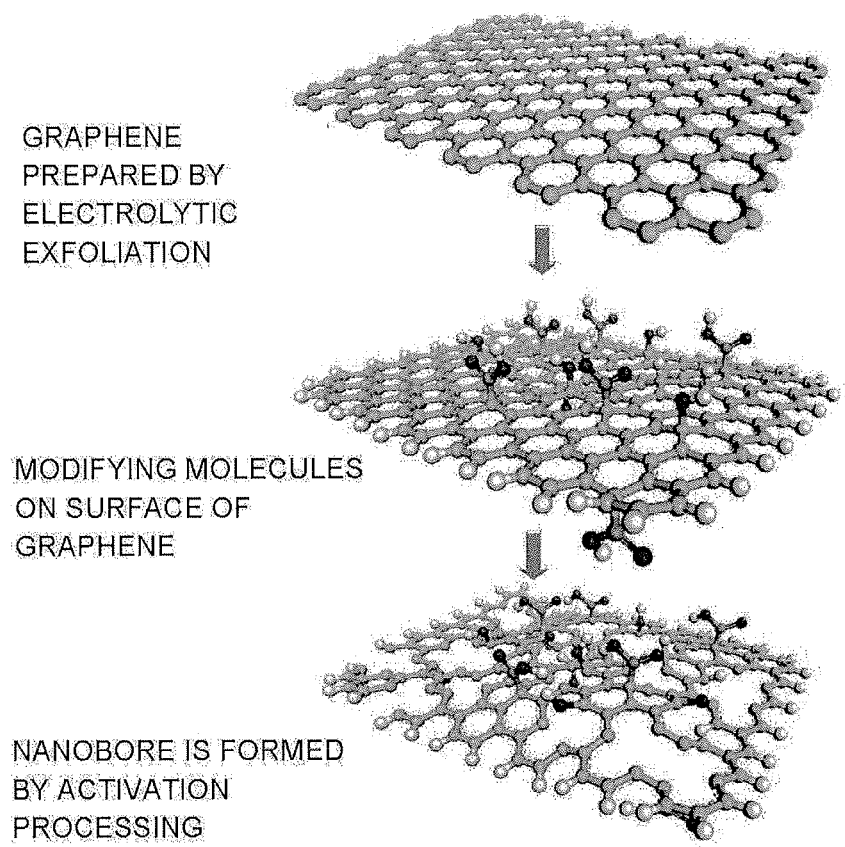
FIG. 13 is a view illustrating a state where a nanobore is formed by modification of modifying molecules to a surface of graphene during electrolytic exfoliation, and by activation processing.

FIG. 13 is a view illustrating a state modifying of the modifying molecules during electrolytic exfoliation, and forming the nanobore by activation processing. By applying a positive voltage, the surface of the graphene is oxidized, the modifying molecules such as the carbonyl group are formed and become a base point(s) of formation of the nanobore, and these modifying molecules are removed by applying a negative voltage.

As illustrated in FIG. 13, the nanobore is created in the activation processing step.

By the method for preparing ultrathin graphene pieces according to the embodiment of the present invention, it is possible to obtain an ultrathin graphene piece in which a ratio of single layer is high by a simple device in a short period of time. It is possible to prepare powder in which a ratio of ultrathin graphene piece is high. The graphene powder in which the ratio of single layer is high is the most appropriate as a material of a transparent conductive film or an electrode of the capacitor.

Ultrathin Graphene Piece Capacitor

Next, an ultrathin graphene piece capacitor according to the embodiment of the present invention will be described.

Figure 14:
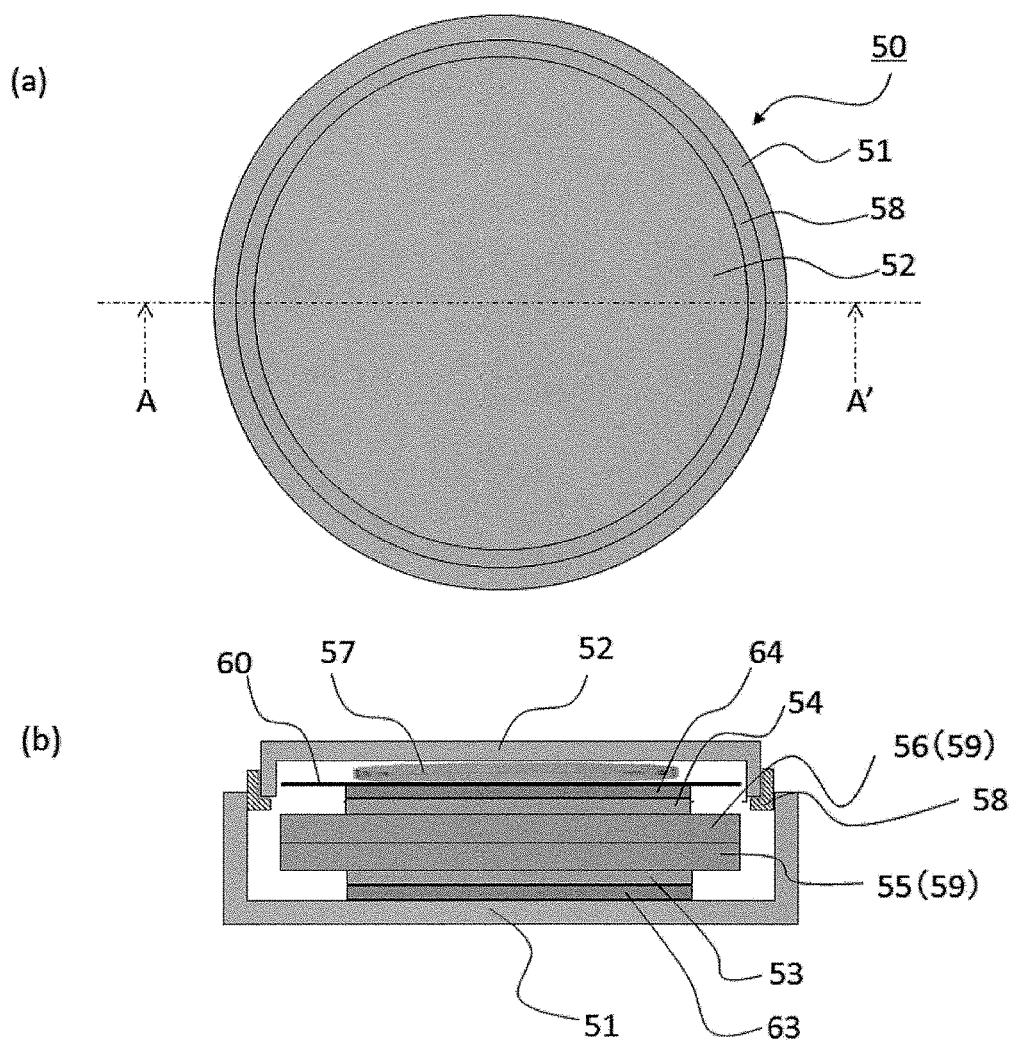
FIG. 14 is a schematic view illustrating an example of an ultrathin graphene piece capacitor according to the embodiment of the present invention.

FIG. 14 is a schematic view illustrating an example of the ultrathin graphene piece capacitor according to the embodiment of the present invention. FIG. 14(a) is a plan view, and FIG. 14(b) is a cross-sectional view along line A-A' in FIG. 14(a).

As illustrated in FIG. 14, an ultrathin graphene piece capacitor 50 according to the embodiment of the present invention comprises two electrodes 63 and 64, and electrolytic solution impregnated layers 55 and 56 which are disposed between the electrodes 63 and 64.

Specifically, the ultrathin graphene piece capacitor 50 comprises coin cell caps 51 and 52, the electrodes 63 and 64, substrates 53 and 54, the electrolytic solution impregnated layers 55 and 56 which serve as a separator 59, a steel spacer 60, a spring 57, and a gasket 58. In the ultrathin graphene piece capacitor 50, a coin cell case which is made of the coin cell caps 51 and 52 and the gasket 58 is formed. The coin cell case is a hollow body, the coin cell cap 52 is fitted to the coin cell cap 51 via the gasket 58, and the inside is formed to be tightly closed.

A porous part is provided in the substrates 53 and 54, and the electrolytic solution which is impregnated to the electrolytic solution impregnated layers 55 and 56 can respectively flow in and out of electrodes 63 and 64.

The electrolytic solution impregnated layers 55 and 56 may be a paper filter or the like.

The electrodes 63 and 64 of the ultrathin graphene piece capacitor 50 according to the embodiment of the present invention are electrodes which are made by integrating and aggregating the powder comprising the ultrathin graphene pieces 1 to 5 and by molding the powder in a plate shape. Accordingly, the specific surface area of the activated graphene is large, the ultrathin graphene piece in which activity of the graphene is improved is integrated and aggregated, and the ultrathin graphene piece can be used as the electrode for the capacitor in which capacitor performance is improved.

The powder comprising the ultrathin graphene pieces 1 to 5 is powder comprising equal to or greater than 50% by mass of ultrathin graphene pieces 1 to 5. Equal to or greater than 70% by mass is more preferable, equal to or greater than 90% by mass is still more preferable, and 100% by mass is particularly preferable.

Powder comprising the many activated ultrathin graphene pieces 1 to 3 in which the modifying molecules do not remain is more preferable than powder comprising the ultrathin graphene pieces 4 and 5 in which the modifying molecules remain. In addition, powder comprising the many activated ultrathin graphene pieces 3 and 5 in which the hole is formed is more preferable than powder comprising the ultrathin graphene pieces 1, 2, and 4 in which the hole is not formed. Accordingly, powder in which less than 10 pieces of graphene are overlapped, the hole is formed, the modifying molecules are also removed, and many activated ultrathin graphene pieces 3 are comprised is preferable.

A carbon nanotube may be dispersed in the electrodes 63 and 64. Accordingly, it is possible to three-dimensionally link the ultrathin graphene pieces, and to enhance the strength, and at the same time, it is possible to link the surface of the graphene by the carbon nanotube, and to improve activity of the surface of the graphene.

In addition, without dispersing the carbon nanotube in the electrodes 63 and 64, the powder comprising the ultrathin graphene piece may be integrated and aggregated, and be molded in a plate shape.

Method of Manufacturing Ultrathin Graphene Piece Capacitor

Next, a method of manufacturing ultrathin graphene piece capacitor according to the embodiment of the present invention will be described.

The method of manufacturing ultrathin graphene piece capacitor according to the embodiment of the present invention comprises: a step of molding powder comprising the ultrathin graphene pieces 1 to 5 by filtering, washing, and drying a solution (for example, the electrolytic solution in which the powder comprising the ultrathin graphene piece is dispersed), in which the powder comprising the ultrathin graphene pieces 1 to 5 is dispersed, in a plate shape; and a step of manufacturing the capacitor by using the plate-shaped powder comprising the ultrathin graphene pieces 1 to 5 as an electrode. By filtering, washing, and drying a solution in which the powder comprising the ultrathin graphene pieces 1 to 5 is dispersed, it is possible to easily prepare a molded body in a desired shape.

In the step of molding the ultrathin graphene piece in a plate shape, it is preferable that the carbon nanotube is dispersed in the solution in which the powder comprising the ultrathin graphene piece is dispersed. Accordingly, it is possible to three-dimensionally link the ultrathin graphene pieces by the carbon nanotube, and to enhance the strength, and at the same time, it is possible to link the surface of the graphene by the carbon nanotube, and to improve activity of the surface of the graphene.

In the step of manufacturing the capacitor, the capacitor is manufactured by using the powder comprising the plate-shaped ultrathin graphene piece as an electrode. For example, by preparing two electrodes which are configured of a plate-shaped molded body of the powder comprising the ultrathin graphene piece, and disposing the electrolytic solution impregnated layer between the two electrodes, the capacitor is manufactured.

Figure 15:
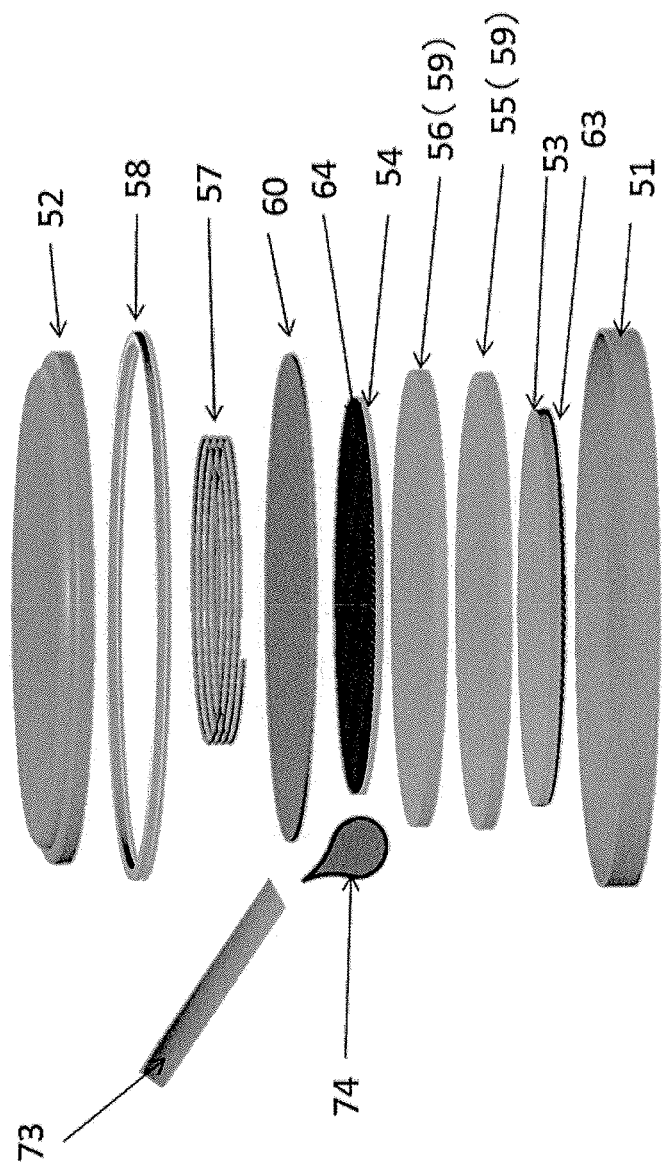
FIG. 15 is an exploded view of the ultrathin graphene piece capacitor according to the embodiment of the present invention.

FIG. 15 is an exploded view of the ultrathin graphene piece capacitor 50 according to the embodiment of the present invention.

As illustrated in FIG. 15, the coin cell cap (coin cell case main body) 51, a sample electrode which is made of the electrode 63 and the substrate 53, the electrolytic solution impregnated layers 55 and 56 which serve as the separator 59, a sample electrode which is made of the substrate 54 and the electrode 64, the steel spacer 60, the spring 57, the gasket 58, and the coin cell cap 52 are stacked in this order, and the ultrathin graphene piece capacitor 50 is manufactured.

The electrodes 63 and 64 are made by molding powder 71 of the graphene comprising the ultrathin graphene piece in a shape of a disk. For example, the diameter thereof is 1.5 cm.

In the stacking step, an electrolytic solution 74 is dropped onto the electrolytic solution impregnated layers 55 and 56 by a dropper 73.

The apparatus 20 for preparing ultrathin graphene pieces according to the embodiment of the present invention comprises: the graphite electrode 21; the counter electrode 22 which is made of graphite, a corrosion resistant alloy, or a precious metal; the electrolytic solution 25 in which one end sides of the two electrodes are immersed; the container 24 which stores the electrolytic solution 25; and the power source 28 which is connected to the two electrodes via the wirings 26 and 27, and the porous filter 23 is provided so as to cover at least the immersed part of the graphite electrode 21 which is immersed in the electrolytic solution 25. For this reason, it is possible to bring the exfoliated thick graphene piece into contact with the graphite electrode, during the electrolysis. The electrolytic solution can flow in and out via the pore of the porous filter, but it is possible to prevent the thick graphene piece which is detached from the graphite electrode from flowing in and out of the electrolytic solution on the outside of the porous filter. By holding the thick graphene piece which is detached from the graphite electrode in the porous filter and by continuing to bring the thick graphene piece into contact with the graphite electrode, it is possible to make many thick graphene pieces into the ultrathin graphene piece in which less than 10 pieces of graphene are overlapped. During the electrolysis, since a exfoliating action of graphene continues regarding not only the graphite electrode, but also the exfoliated thick graphene piece, a graphene in which the number of overlapped exfoliated graphenes is small, the ratio of single-layered graphene is high, and unevenness is uniformly small is obtained. In addition, since the configuration is only for covering the graphite electrode with the porous filter, it is not necessary to improve the apparatus or the electrolytic exfoliation process. A special process technology for high productivity is also not necessary. It is possible to make an apparatus having a green process in which an amount of waste is small and a dangerous type of drug is not used.

In the apparatus 20 for preparing ultrathin graphene pieces according to the embodiment of the present invention, the graphite electrode 21 is made of natural graphite or highly oriented pyrolytic graphite (HOPG). For this reason, it is possible to efficiently prepare the ultrathin graphene piece in which less than 10 pieces of graphene are overlapped.

In the apparatus 20 for preparing ultrathin graphene pieces according to the embodiment of the present invention, the counter electrode 22 which is made of a precious metal is a platinum sheet. For this reason, it is possible to efficiently prepare the ultrathin graphene piece in which less than 10 pieces of graphene are overlapped.

In the apparatus 20 for preparing ultrathin graphene pieces according to the embodiment of the present invention, the electrolytic solution 25 is an acid aqueous solution, an organic solvent, or ion liquid. For this reason, it is possible to efficiently prepare the ultrathin graphene piece in which less than 10 pieces of graphene are overlapped.

In the apparatus 20 for preparing ultrathin graphene pieces according to the embodiment of the present invention, the acid aqueous solution is any of aqueous solutions of a sulfuric acid, a hydrochloric acid, and a nitric acid. For this reason, it is possible to efficiently prepare the ultrathin graphene piece in which less than 10 pieces of graphene are overlapped by intercalating the ions of the acid aqueous solution. For example, when the acid aqueous solution is a diluted sulfuric acid, it is possible to efficiently prepare the ultrathin graphene piece in which less than 10 pieces of graphene are overlapped by intercalating $SO_2$ ions.

In the apparatus 20 for preparing ultrathin graphene pieces according to the embodiment of the present invention, the organic solvent is polypropylene carbonate to which 1 M of $LiPF_6$ is added. For this reason, it is possible to efficiently prepare the ultrathin graphene piece in which less than 10 pieces of graphene are overlapped by intercalating $PF_6^{-1}/PC$ complex.

In the apparatus 20 for preparing ultrathin graphene pieces according to the embodiment of the present invention, the porous filter 23 is a filter paper. For this reason, it is possible to efficiently prepare the ultrathin graphene piece in which less than 10 pieces of graphene are overlapped.

In the method for preparing ultrathin graphene pieces according to the embodiment of the present invention, the apparatus 20 for preparing graphene pieces is used, the graphite electrode 21 is used as an anode and the counter electrode 22 is used as a cathode, and a voltage is applied between the electrodes. For this reason, it is possible to cover the graphite electrode with the porous filter through which the electrolytic solution or the ions can flow in and out of the graphite electrode, and to bring the exfoliated thick graphene piece into contact with the graphite electrode. Accordingly, the electrolytic solution can flow in and out via the pore of the porous filter, but it is possible to prevent the thick graphene piece which is exfoliated from the graphite electrode from flowing out to the electrolytic solution on the outside of the porous filter. By holding the thick graphene piece exfoliated from the graphite electrode in the porous filter and by continuing to bring the thick graphene piece into contact with the graphene electrode, it is possible to continue to apply a voltage to the thick graphene piece. Accordingly, it is possible to reduce the number of overlapped graphenes, to make a single-layered graphene, and to make many thick graphene pieces into the ultrathin graphene piece in which less than 10 pieces of graphene are overlapped. During the electrolysis, since the exfoliating action of graphene continues regarding not only the graphite electrode, but also the exfoliated thin graphene piece, a graphene in which the number of overlapped exfoliated graphenes is small, the ratio of single-layered graphene is high, and unevenness is uniformly small is obtained. In addition, graphene which has fewer defects, less modification of oxidative molecules (modifying molecules), and excellent conductivity or transparency is obtained. In addition, it is possible to prepare a large quantity of powder in which the ratio of single-layered graphene is high at a low coast with high efficiency. Furthermore, since the electrolyte exfoliation method does not generate waste, such as a strong acid or hydrazine, in the of preparing process, it is possible to achieve an eco-friendly green process.

In the method for preparing ultrathin graphene pieces according to the embodiment of the present invention, the first voltage applying step of applying a voltage which is +0.1 V to +10 V between the electrodes 21 and 22 for 1 minute to 10 minutes, the second voltage applying step of applying a voltage which is +1 V to +10 V between the electrodes 21 and 22 for 1 minute to 10 minutes, and the third voltage applying step of applying a voltage which is +5 V to +15 V between the electrodes 21 and 22 for 1 hour to 2 hours, are sequentially performed. For this reason, it is possible to improve yield of the ultrathin graphene piece.

In the method for preparing ultrathin graphene pieces according to the embodiment of the present invention, after the third voltage applying step, the organic solvent dispersion step of dispersing powder which is obtained by filtering, washing, and drying the electrolytic solution in the organic solvent, and irradiating ultrasonic waves is performed. For this reason, it is possible to further exfoliate the thin graphene piece in which the number of overlapped graphenes is large by the effect of exfoliating the graphene by the organic solvent. Accordingly, it is possible to make the number of the overlapped graphenes small, to increase the ratio of one single-layered graphene, and to further improve yield of the ultrathin graphene piece. By adding the effect of exfoliating graphene in the organic solvent in addition to electrolytic exfoliation, it is possible to establish a process of electrolytic exfoliation which can realize mass production of graphene having high performance in which the ratio of single-layered graphene is much higher at a low cost.

In the method for preparing ultrathin graphene pieces according to the embodiment of the present invention, the organic solvent is any of N-methylpyrrolidone (NMP), dimethylformamide (DMF), N,N-Dimethylacetamide (DMA), γ-buthyrolactone (GBL), or 1,3-dimethyl-2-imidazolidinone (DMEU). For this reason, it is possible to further improve yield of the ultrathin graphene piece.

In the method for preparing ultrathin graphene pieces according to the embodiment of the present invention, after the third voltage applying step, the activation processing step of applying a voltage which is +5 V to +15 V between the electrodes for 60 minutes to 120 minutes is performed. For this reason, it is possible to form (perform activation) the hole (nanobore) on the surface of the graphene.

In the method for preparing ultrathin graphene pieces according to the embodiment of the present invention, after the activation processing step, the modifying molecule removing step of applying a voltage in a reverse direction with the same value of the voltage applied in the activation processing step is performed. For this reason, it is possible to eliminate the modifying molecules which remain on the surface of the graphene.

In the method for preparing ultrathin graphene pieces according to the embodiment of the present invention, the operation which includes the activation processing step and the modifying molecule removing step is repeated two or more times. For this reason, it is possible to efficiently perform activation, and to efficiently eliminate the modifying molecules.

In the ultrathin graphene pieces 1 to 5 according to the embodiment of the present invention, the number of overlapped graphenes 10 is less than 10. For this reason, it is possible to increase the specific surface area per unit mass, and to improve capacitor performance when the ultrathin graphene piece is molded in a plate shape and used as an electrode.

In the ultrathin graphene pieces 3 and 5 according to the embodiment of the present invention, the hole (nanobore 11) is formed in the graphene 10. For this reason, it is possible to more improve activity of the surface of the graphene by a chemically extremely activated end surface around the hole (nanobore). In addition, the hole (nanobore) has a function of adsorbing a large number of ions of electrolytic solution, and performance of electrode of an electric double layer capacitor can be improved. Accordingly, it is possible to develop a capacitor having high power density with high energy density which exceeds the level in the related art.

In the ultrathin graphene pieces 3 and 5 according to the embodiment of the present invention, the diameter of the hole 11 is 1 nm to 20 nm. For this reason, it is possible to improve activity of the surface of the graphene.

In the ultrathin graphene pieces 1 to 3 according to the embodiment of the present invention, the modifying molecules 12 of any of a carbonyl group, a carboxyl group, or a hydroxyl group is not bound to the graphene 10. For this reason, it is possible to improve activity of the surface of the graphene.

The ultrathin graphene piece capacitor 50 according to the embodiment of the present invention is a capacitor comprise: the two electrodes 63 and 64; and electrolytic solution impregnated layers 55 and 56 which are disposed between the electrodes 63 and 64, and the electrode is an electrode which is made by molding the powder comprising the ultrathin graphene pieces 1 to 5 in a plate shape. For this reason, it is possible to make a capacitor having high performance.

In particular, by using the ultrathin graphene piece in which the ratio of the single-layered graphene is high, modification of molecules having deteriorated conductivity is less, and density of the nanobore which adsorbs the ions of the electrolytic solution is high, it is possible to increase energy density and conductivity of the capacitor.

In the ultrathin graphene piece capacitor 50 according to the embodiment of the present invention, the carbon nanotube is dispersed in the electrodes 63 and 64. For this reason, it is possible to three-dimensionally link the ultrathin graphene pieces, to enhance the strength, and to make a capacitor having high performance.

The method of manufacturing capacitor according to the embodiment of the present invention comprises: the step of molding the powder comprising the ultrathin graphene pieces 1 to 5 by filtering, washing, and drying the solution, in which the powder comprising the ultrathin graphene pieces 1 to 5 is dispersed, in a plate shape; and the step of manufacturing a capacitor by using the plate-shaped powder comprising the ultrathin graphene pieces 1 to 5 as the electrodes 63 and 64. For this reason, it is possible to easily manufacture a capacitor having high performance.

In the method of manufacturing capacitor according to the embodiment of the present invention, in the step of molding the powder comprising the ultrathin graphene pieces 1 to 5 in a plate shape, the carbon nanotube is dispersed in the solution. For this reason, it is possible to three-dimensionally link the ultrathin graphene pieces, to enhance the strength, and to make a capacitor having high performance.

The ultrathin graphene piece, the apparatus for preparing ultrathin graphene pieces, the method for preparing ultrathin graphene pieces, the capacitor, and the method of manufacturing capacitor according to the embodiment of the present invention are not limited to the above-described embodiment, and various changes within a range of technical concept of the present invention can be employed. Specific examples of the embodiment will be described in the following Examples. However, the present invention is not limited to these Examples.

Example 1

Preparing Graphene by Continuous Electrolytic Exfoliation

Example 1-1

First, an electrolytic exfoliation apparatus illustrated in FIG. 9 was prepared.

Here, the highly oriented pyrolytic graphite (HOPG) was used as an anode. A platinum sheet (1×2 cm$^2$) was used as a cathode. A potentio-galvanostat which makes a current between the electrodes into a direct current was used as a power source. The filter paper Millipore having 0.22 μm of the pore size which is manufactured by Whatman was used as a porous filter which covers the electrodes. A sulfuric acid ($H_2SO_4$) which is an acidic solution was used as an electrolytic solution. Specifically, a diluted sulfuric acid which is made by diluting a sulfuric acid (4.8 g, 98% of purity) in 100 ml of deionized water was used.

Conditions for Electrolytic Exfoliation

First, +1 V was applied between the electrodes for 10 minutes (first voltage applying).

Then, +10 V was applied for one minute (second voltage applying).

Then, +15 V was applied for 2 hours (third voltage applying).

By the above-described steps, electrolytic exfoliation was performed.

After finishing electrolytic exfoliation, 2.5 V was applied for 10 minutes.

Then, +10 V and −10 V were alternately applied. The voltages were respectively applied for 60 minutes and 120 minutes, and this set of operation was repeated two times. Here, after the third voltage applying step, a step of applying +10 V is the activation processing step, and a step of applying −10 V is the modifying molecule removing step.

In the first voltage applying (applying +1 V for 10 minutes), electrolytic exfoliation was not occurred.

However, as a result of reviewing various conditions, in order to move $SO_4^{2-}$ ions which are intercalated between the graphite layers to the crystal grain boundary of the graphite, initial voltage applying is important.

In the second voltage applying, electrolytic exfoliation was started when the applied voltage is equal to or greater than 8 V. When the voltage is +10 V, the graphene was suddenly detached from the graphite, and floated and was precipitated in the electrolytic solution. When the voltage was equal to or greater than 8 V, as the applied voltage is increased, the exfoliating speed increased. As a result, from a viewpoint of characteristics of exfoliating of graphene, it was determined that 10 V is appropriate as a voltage for the second voltage applying.

By the second voltage applying, the graphene was exfoliated from the graphite, and all of the graphite electrodes (anodes) became thin graphene pieces in the porous filter.

However, in the processing until the second voltage applying, there was a case where interlayer exfoliation of the graphenes in the thin graphene piece was not sufficiently performed. For this reason, in order to more completely perform interlayer exfoliation of the graphenes in the thin graphene piece, the third voltage applying was performed.

In the third voltage applying, by holding the exfoliated thin graphene piece in the porous filter by bring the exfoliated thin graphene piece into contact with the graphite electrode, it was possible to more completely perform interlayer exfoliation of the graphenes in the thin graphene piece. By the third voltage applying, a slurry graphene was formed, and the slurry graphene was held in the porous filter.

By the above-described electrolytic exfoliation, the volume of the electrode was increased by approximately 20%.

The nanobore was formed in the graphene by applying +10 V in the activation processing step.

By applying −10 V in the modifying molecule removing step, the oxidative modifying molecules on the surface of the graphene were reduced. Accordingly, the modifying molecules which are considered to damage conductivity or hydrophilicity of the graphene were removed.

Then, the porous filter was removed, and a slurry material (graphene) was dispersed in the electrolytic solution. Then, the aggregates which floats in the electrolytic solution was eliminated, and the electrolytic solution in which the graphene is dispersed was obtained. After filtering and washing the electrolytic solution, by drying the electrolytic solution, a powder sample of Example 1-1 (after the activation processing) was prepared.

Examples 1-2 and 1-3

As illustrated in Table 2, electrolytic exfoliation method was performed in conditions similar to those in Example 1-1 except that a nitric acid ($HNO_3$) and a hydrochloric acid (HCl) were respectively used as the electrolytic solution, and powder samples of Examples 1-2 and 1-3 were prepared.

Examples 1-1 to 1-3 were performed as preliminary experiments for comparing three types of electrolytic solutions, such as a hydrochloric acid (HCl), a nitric acid ($HNO_3$), and a sulfuric acid ($H_2SO_4$). Among the three types of electrolytic solutions, such as a hydrochloric acid (HCl), a nitric acid ($HNO_3$), and a sulfuric acid ($H_2SO_4$), the sulfuric acid showed the most excellent characteristics of electrolytic exfoliation, a diluted sulfuric acid which is made by diluting a sulfuric acid (4.8 g, 98% of purity) in 100 ml of deionized water was determined as a basic electrolytic solution of an acidic solution for electrolytic exfoliation.

TABLE 2

| | Anode | Cathode | Electrolytic solution Acidic solution |
|---|---|---|---|
| Example 1-1 | Highly oriented pyrolytic graphite (HOPG) | Platinum sheet (1 × 2 cm$^2$) | Sulfuric acid ($H_2SO_4$) |
| Example 1-2 | Highly oriented pyrolytic graphite (HOPG) | Platinum sheet (1 × 2 cm$^2$) | Nitric acid ($HNO_3$) |
| Example 1-3 | Highly oriented pyrolytic graphite (HOPG) | Platinum sheet (1 × 2 cm$^2$) | Hydrochloric acid (HCl) |

Examples 1-4 to 1-8

The electrolytic exfoliation method was performed in conditions similar to those in Example 1-1 except that an anode and a cathode were combined as illustrated in Table 3, and powder samples of Examples 1-4 to 1-8 (after the activation processing) were prepared.

Specifically, highly oriented pyrolytic graphite (HOPG) or natural graphite (99.99% of purity, manufactured by Nilaco Corporation) was used as an anode, and any of a platinum sheet (1×2 cm$^2$), highly oriented pyrolytic graphite (HOPG), or natural graphite (99.99% of purity, manufactured by Nilaco Corporation) was used as a cathode.

In addition, an influence of difference in theses electrodes on electrolytic exfoliation was not clearly confirmed.

TABLE 3

| | Anode | Cathode | Electrolytic solution Acidic solution |
|---|---|---|---|
| Example 1-4 | Highly oriented pyrolytic graphite (HOPG) | Natural graphite (99.99% of purity, manufactured by Nilaco Corporation) | Sulfuric acid ($H_2SO_4$) |
| Example 1-5 | Highly oriented pyrolytic graphite (HOPG) | Highly oriented pyrolytic graphite (HOPG) | Sulfuric acid ($H_2SO_4$) |
| Example 1-6 | Natural graphite (99.99% of purity, manufactured by Nilaco Corporation) | Platinum sheet (1 × 2 cm$^2$) | Sulfuric acid ($H_2SO_4$) |
| Example 1-7 | Natural graphite (99.99% of purity, manufactured by Nilaco Corporation) | Natural graphite (99.99% of purity, manufactured by Nilaco Corporation) | Sulfuric acid ($H_2SO_4$) |
| Example 1-8 | Natural graphite (99.99% of purity, manufactured by Nilaco Corporation) | Highly oriented pyrolytic graphite (HOPG) | Sulfuric acid ($H_2SO_4$) |

Examples 1-9 to 1-14

The electrolytic exfoliation method was performed in conditions similar to those in Example 1-1 except that an organic solvent was used as the electrolytic solution, an anode and a cathode were combined as illustrated in Table 4, and the second voltage applying was changed on the condition of electrolytic exfoliation as illustrated below.

Specifically, as an organic solvent (electrolytic solution), the polypropylene carbonate to which 1 M of $LiPF_6$ is added was used.

TABLE 4

| | Anode | Cathode | Electrolytic solution Organic solvent |
|---|---|---|---|
| Example 1-9 | Highly oriented pyrolytic graphite (HOPG) | Platinum sheet (1 × 2 cm$^2$) | Polypropylene carbonate to which 1M of $LiPF_6$ is added |
| Example 1-10 | Highly oriented pyrolytic graphite (HOPG) | Natural graphite (99.99% of purity, manufactured by Nilaco Corporation) | Polypropylene carbonate to which 1M of $LiPF_6$ is added |
| Example 1-11 | Highly oriented pyrolytic graphite (HOPG) | Highly oriented pyrolytic graphite (HOPG) | Polypropylene carbonate to which 1M of $LiPF_6$ is added |
| Example 1-12 | Natural graphite (99.99% of purity, manufactured by Nilaco Corporation) | Platinum sheet (1 × 2 cm$^2$) | Polypropylene carbonate to which 1M of $LiPF_6$ is added |
| Example 1-13 | Natural graphite (99.99% of purity, manufactured by Nilaco Corporation) | Natural graphite (99.99% of purity, manufactured by Nilaco Corporation) | Polypropylene carbonate to which 1M of $LiPF_6$ is added |
| Example 1-14 | Natural graphite (99.99% of purity, manufactured by Nilaco Corporation) | Highly oriented pyrolytic graphite (HOPG) | Polypropylene carbonate to which 1M of $LiPF_6$ is added |

Conditions for Electrolytic Exfoliation

Specifically, first, +1 V was applied between the electrodes for 10 minutes (first electrode applying).

Then, a voltage of the second voltage applying was applied by setting the voltage as any of 10 V, 15 V, 20 V, 25 V, 30 V, 35 V, and 40 V, and by setting the applying time as any of 10 minutes, 20 minutes, 30 minutes, 40 minutes, 50 minutes, and 60 minutes.

When the voltage of the second voltage applying is a high voltage, the exfoliating speed was fast, but the exfoliated thin graphene piece became thick. For this reason, since the high voltage is not appropriate as a basic voltage of electrolytic exfoliation, the basic voltage of electrolytic exfoliation was determined as 10 V which is a low voltage. In addition, the applying time was determined as 60 minutes.

When the electrolytic solution is the above-described organic solvent, compared to the diluted sulfuric acid, there is a tendency that the applied voltage for occurring electrolytic exfoliation is high, and the time for electrolytic exfoliation is long. It was considered that this was because the characteristics of exfoliating of graphene when the above-described organic solvent is used as the electrolytic solution is not as excellent as those of the diluted sulfuric acid.

Then, +15 V was applied for 2 hours (third voltage applying).

By the above-described steps, electrolytic exfoliation was performed.

After finishing electrolytic exfoliation, the activation processing step and the modifying molecule removing step were performed similarly to Example 1-1. In other words, after finishing electrolytic exfoliation, 2.5 V was applied for 30 minutes, and then, +10 V and −10 V were alternately applied. The voltages were respectively applied for 60 minutes and 120 minutes, and this set of operation was repeated two times.

Then, the powder samples of Example 1-9 (after the activation processing) to Example 1-14 (after the activation processing) were prepared by removing the porous filter, eliminating the aggregates which floats in the electrolytic solution, filtering and washing the electrolytic solution in which the graphene is dispersed, and drying the electrolytic solution.

In addition, regarding Example 1-9, regardless of the powder sample of Example 1-9 (after the activation processing), the powder sample of Example 1-9 (after finishing electrolytic exfoliation) was prepared. The powder sample of Example 1-9 (after finishing electrolytic exfoliation) is a powder sample which is prepared without performing the activation processing step and the modifying molecule removing step in a method for preparing the powder sample of Example 1-9 (after the activation processing).

Figure 16:
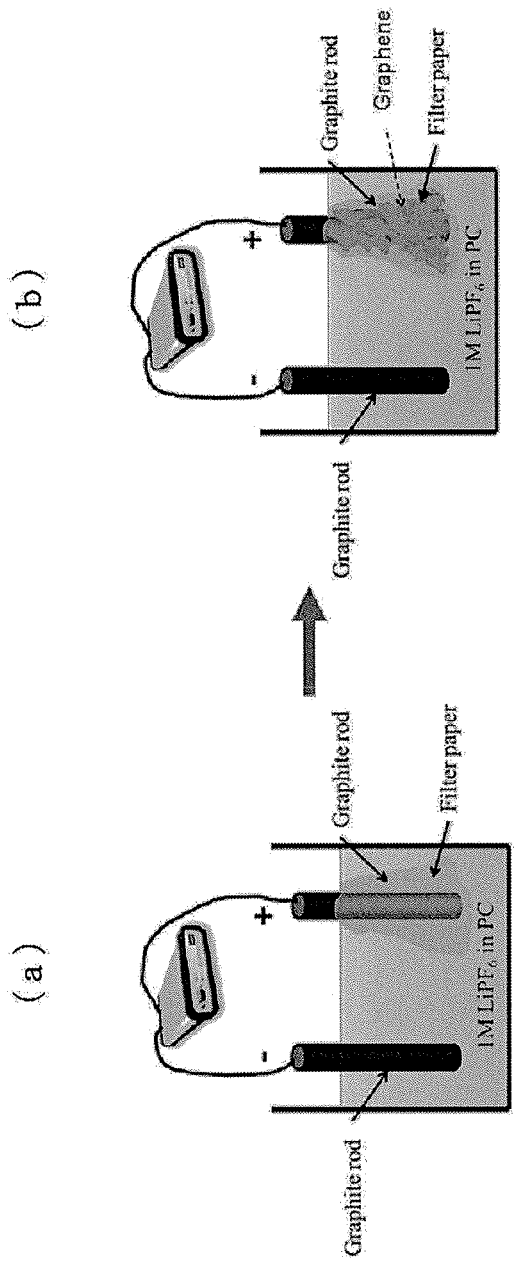
FIG. 16 is a schematic view illustrating an example of a device for preparing a powder sample of Example 1-11 (after the activation processing).

FIG. 16 is a schematic view illustrating an example of an apparatus for preparing the powder sample of Example 1-11 (after the activation processing). FIG. 16(a) is a view before the electrolytic exfoliation processing, and FIG. 16(b) is a view after the processing.

A graphite rod of HOPG is also used as any electrode. The porous filter is wound around and fixed to a tip end side of one electrode (anode) in a shape of a bag.

As illustrated in FIG. 16(b), after the electrolytic exfoliation, the slurry graphene is formed, but the produced graphene is held in a bag.

Observation of Ultrathin Graphene Piece after Finishing Electrolytic Exfoliation First, the powder sample of Example 1-9 (after finishing electrolytic exfoliation) was observed by a scanning electron microscope (SEM) and a transmission electron microscope (TEM).

The powder sample of Example 1-9 (after finishing electrolytic exfoliation) is a thin graphene piece which is obtained by electrolytic exfoliation, by using polypropylene carbonate to which $LiPF_6$ is added as an organic solvent (electrolytic solution), the highly oriented pyrolytic graphite (HOPG) as an anode, and the platinum sheet ($1\times2$ $cm^2$) as a cathode.

Figure 17:
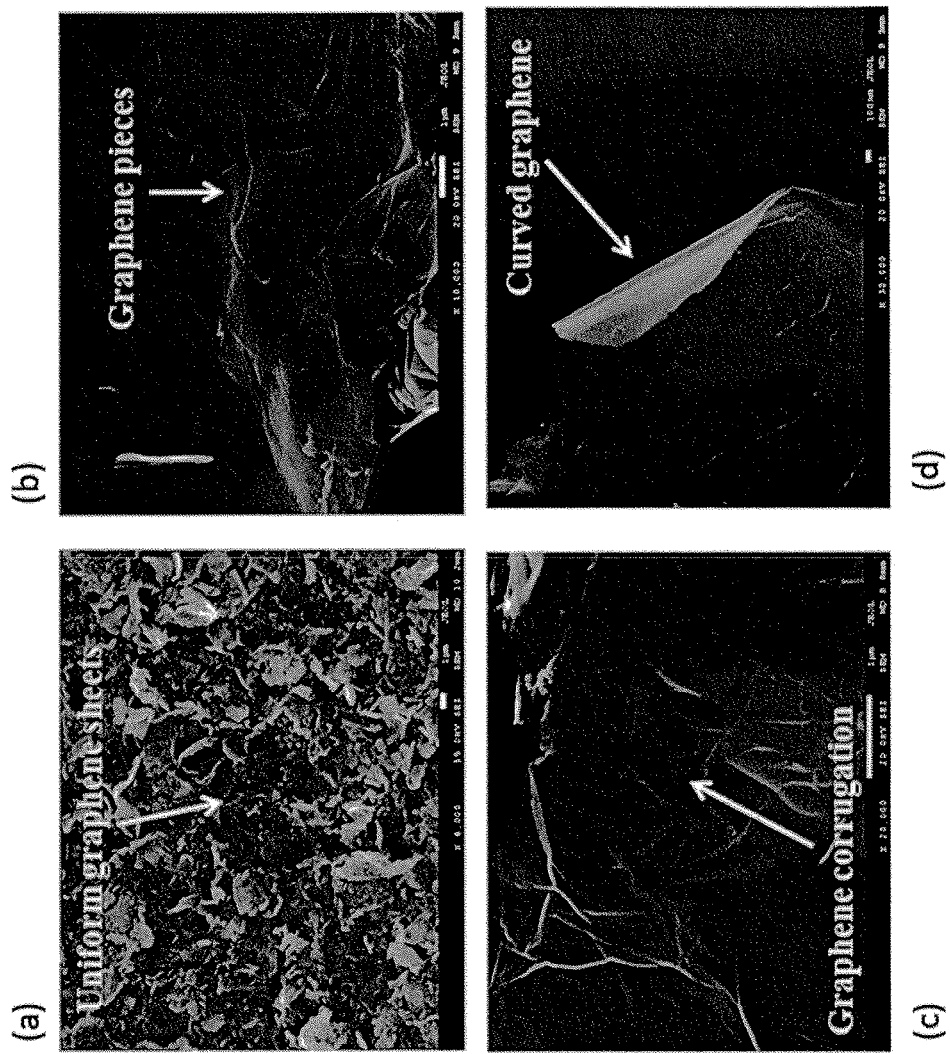
FIG. 17 is a scanning electron microscope (SEM) image of a powder sample of Example 1-9 (after finishing electrolytic exfoliation).

FIG. 17 is a scanning electron microscope (SEM) image of the powder sample of Example 1-9 (after finishing electrolytic exfoliation).

FIG. 17(a) illustrates uniform graphene sheets. FIG. 17(b) illustrates graphene pieces. Several thin graphene pieces are overlapped. FIG. 17(c) illustrates graphene corrugation. FIG. 17(d) illustrates curved graphene.

Figure 18:
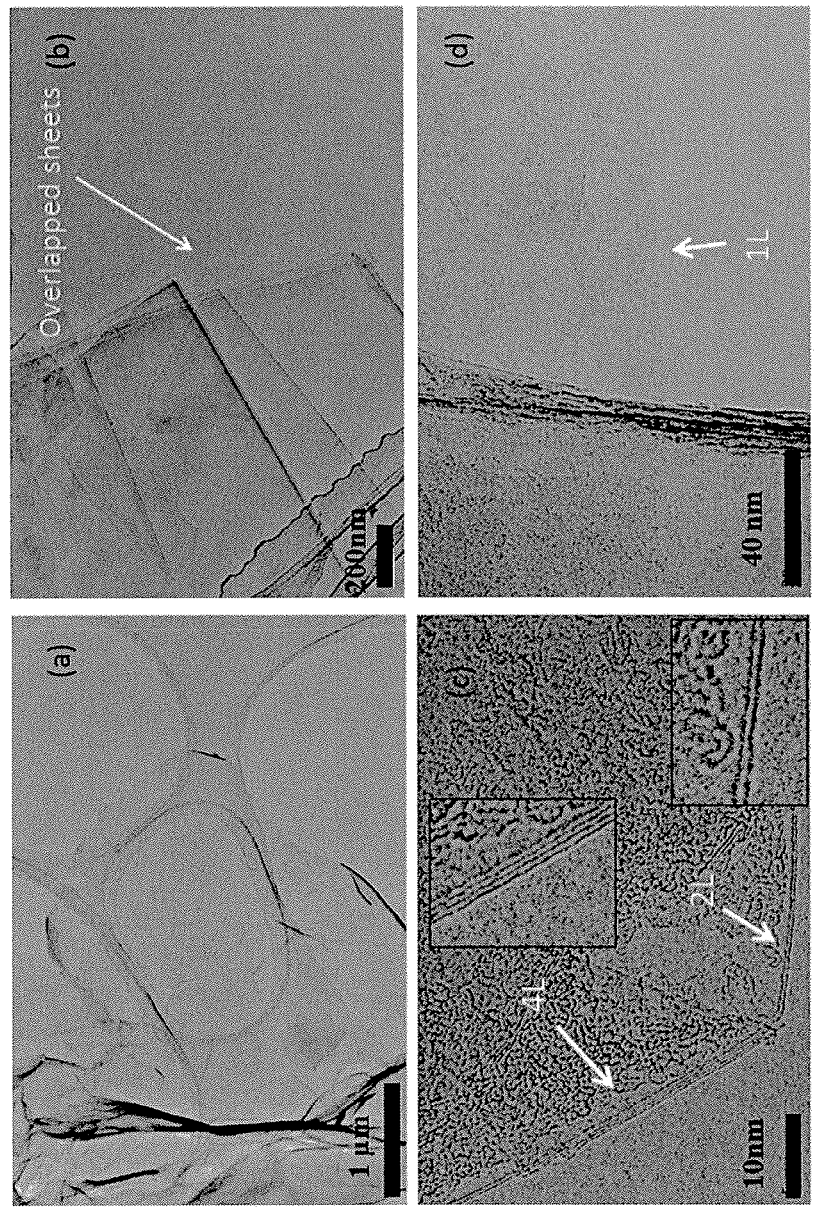
FIG. 18 is a transmission electron microscope (TEM) image of the powder sample of Example 1-9 (after finishing electrolytic exfoliation).

FIG. 18 is a transmission electron microscope (TEM) image of the powder sample of Example 1-9 (after finishing electrolytic exfoliation).

FIG. 18(a) illustrates the entire image of the thin graphene piece. The thin graphene piece became a sheet. FIG. 18(b) illustrates an overlapped state of graphene. Several pieces of thin graphene piece are overlapped. FIG. 18(c) illustrates that four pieces of graphene (4L: 4 layers) and 2 pieces of graphene (2L: 2 layers) are overlapped. FIG. 18(d) is a single-layered (1L: 1 layer) graphene.

Figure 19:
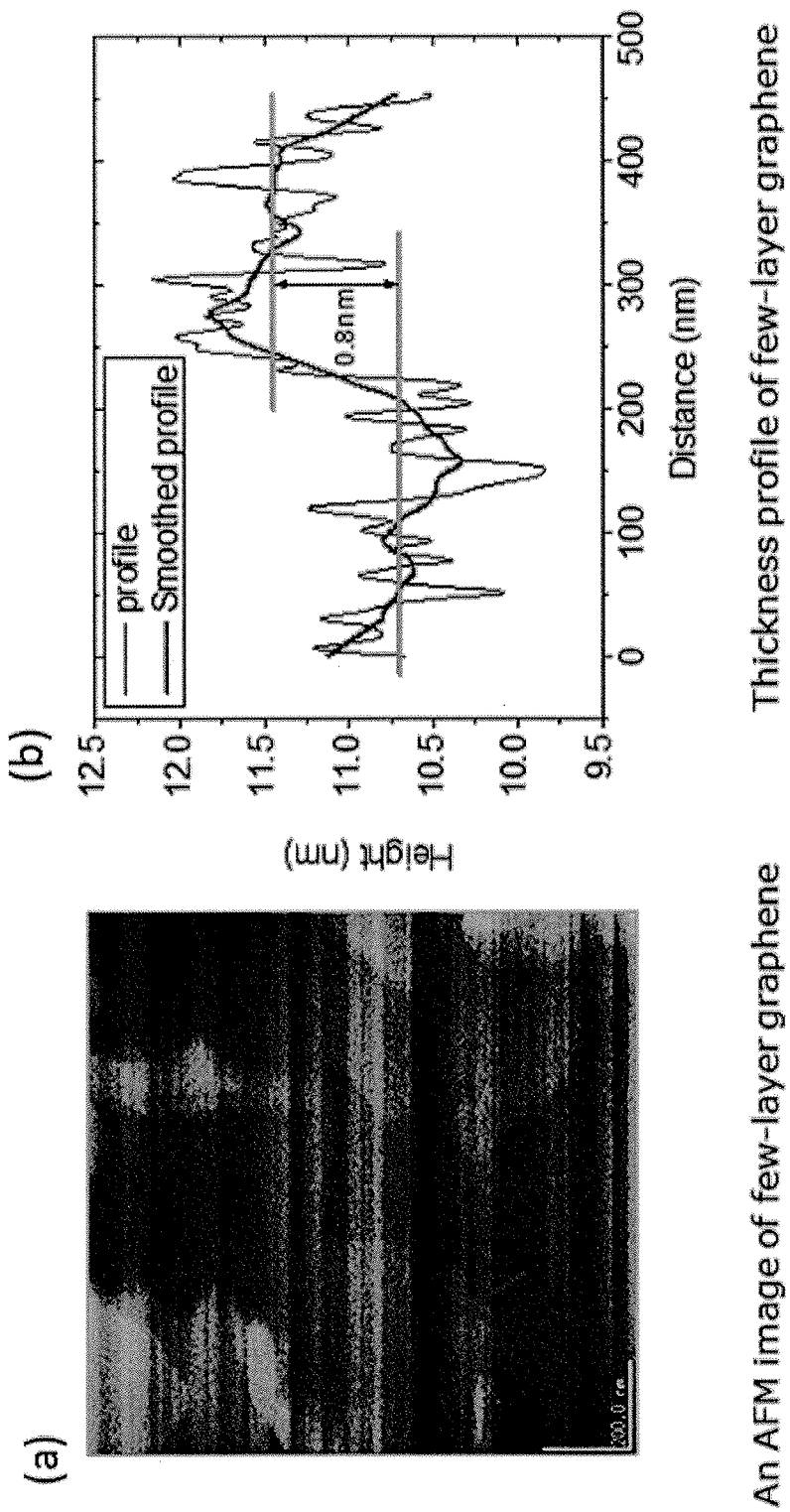
FIG. 19 is an AFM image of the powder sample of Example 1-9 (after finishing electrolytic exfoliation).

FIG. 19 is an AFM image (a) and a thickness profile (b) of the powder sample of Example 1-9 (after finishing electrolytic exfoliation).

The thickness of the sample is 0.8 nm, that is, approximately 2 pieces of graphene are overlapped.

Figure 20:
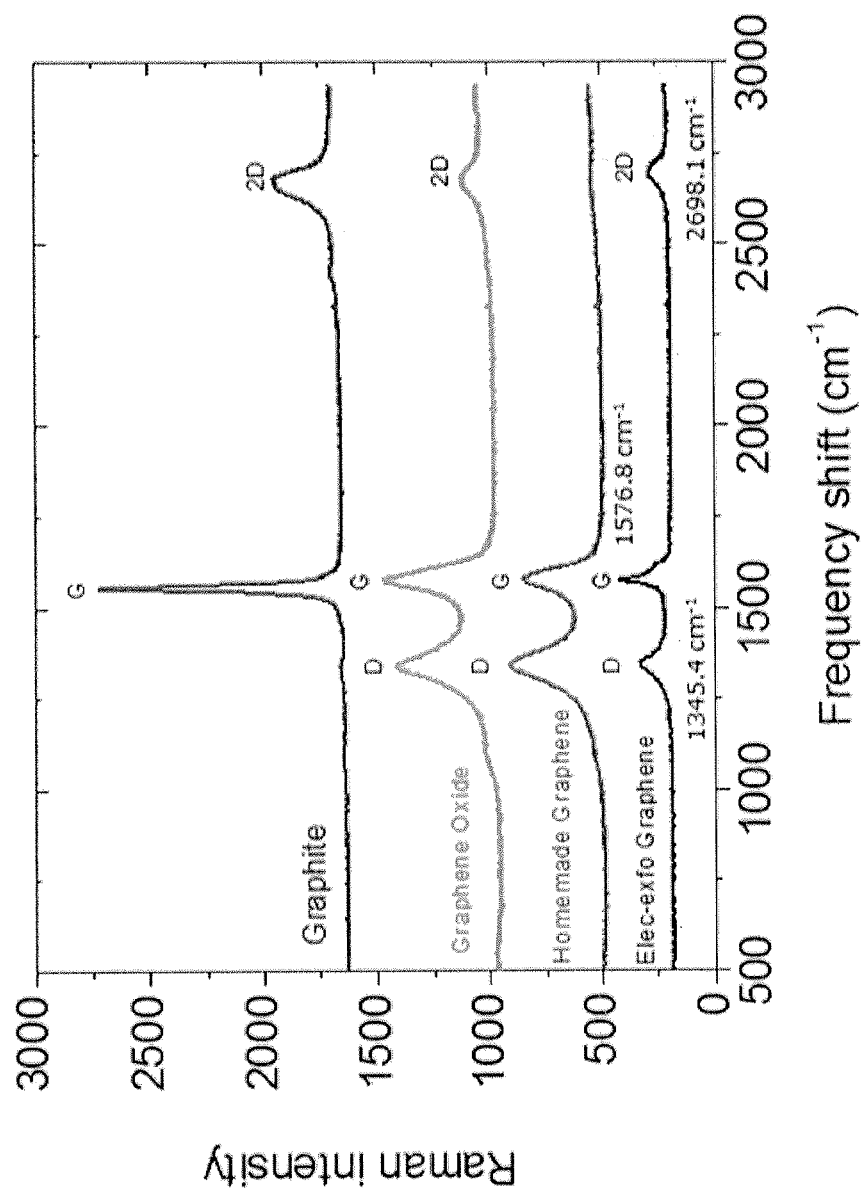
FIG. 20 is a Raman spectroscopy of the powder sample of Example 1-9 (after finishing electrolytic exfoliation).

FIG. 20 is a Raman spectroscopy of the powder sample of Example 1-9 (after finishing electrolytic exfoliation). The powder sample is written as elec-exfo graphene. For comparison, spectra of homemade graphene (graphene by a chemical method), graphene oxide (graphene which is prepared by a chemical exfoliation method), and graphite are also illustrated.

Slide glass is used as a substrate, and light having a peak wavelength of 514 nm is used.

G is a peak of a graphitized material, and D is a peak of defects. 2D is a peak which is related to the number of graphenes.

Figure 21:
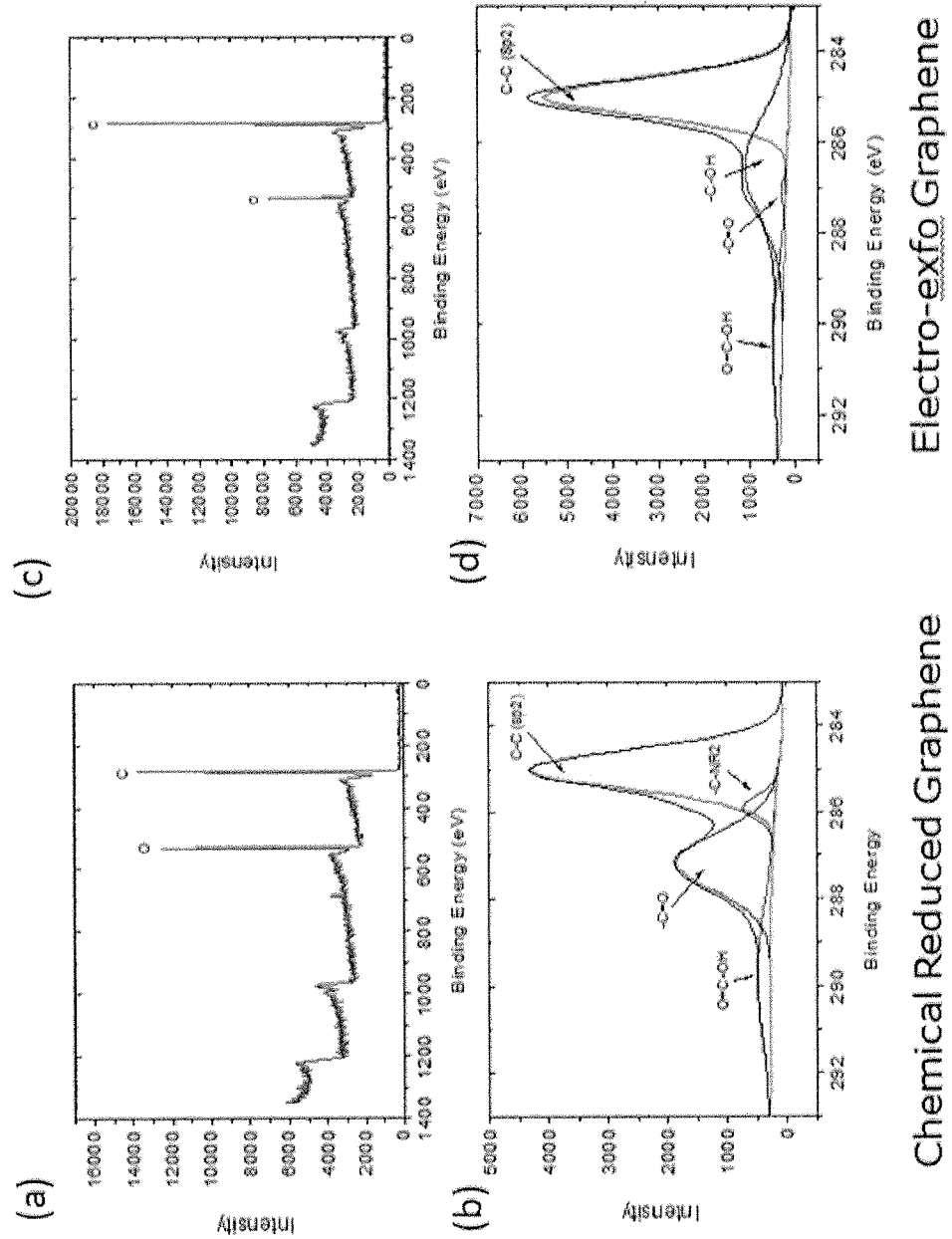
FIG. 21 is an XPS of the powder sample of Example 1-9 (after finishing electrolytic exfoliation).

FIG. 21 is an XPS of the powder sample of Example 1-9 (after finishing electrolytic exfoliation). The powder sample is written as electro-exfo graphene (FIGS. 21(c) and 21(d)). For comparison, spectra of chemical reduced graphene (graphene oxide which is prepared by the chemical exfoliation method) are also illustrated (FIGS. 21(a) and 21(b)).

Observation of Ultrathin Graphene Piece after Finishing Activation Processing Step and Modifying Molecule Removing Step Then, the powder sample of Example 1-9 (after the activation processing) was observed by a transmission electron microscope.

Figure 22:
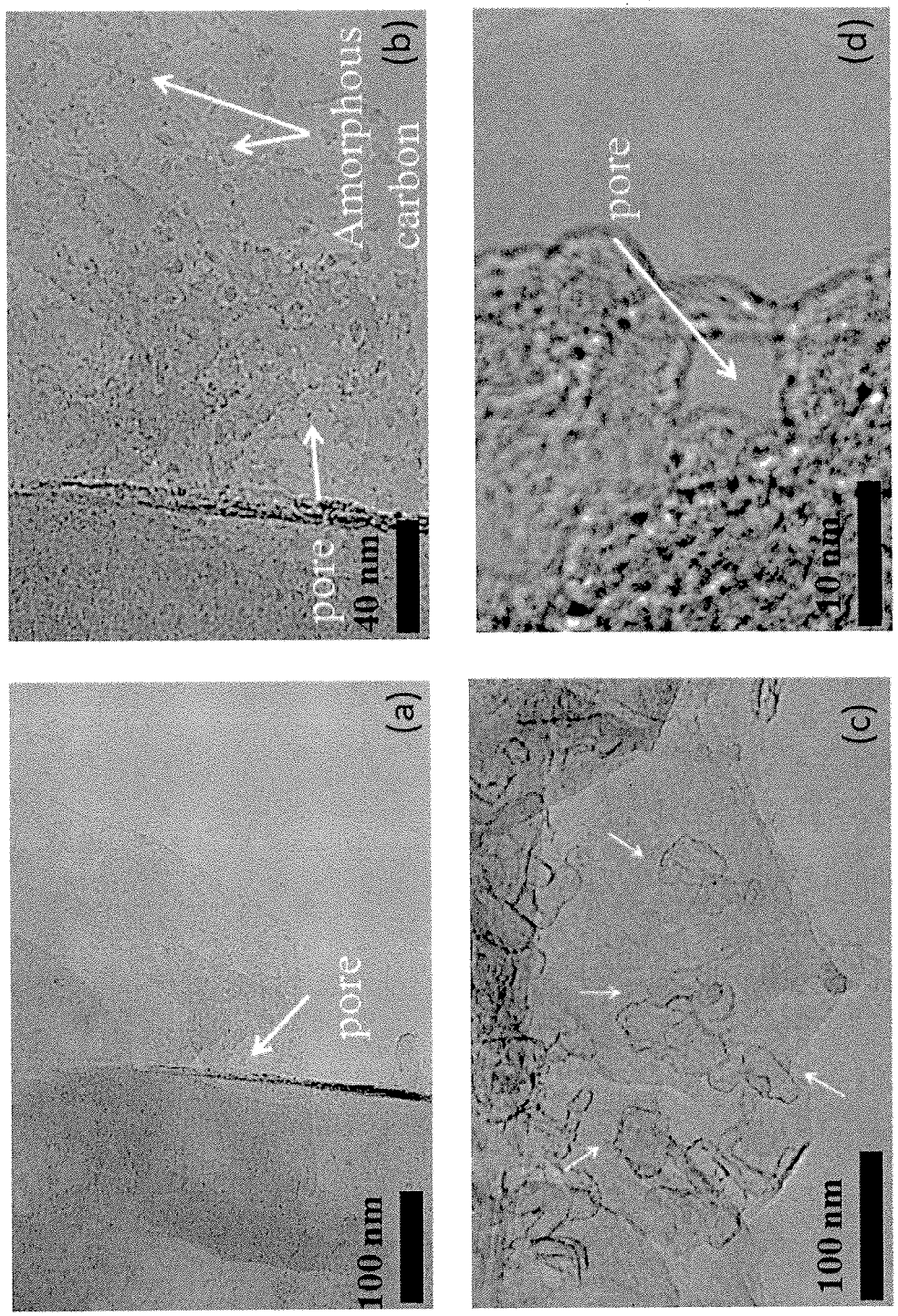
FIG. 22 is a transmission electron microscope image of the powder sample of Example 1-9 (after the activation processing).

FIG. 22 is a transmission electron microscope image of the powder sample of Example 1-9 (after the activation processing).

The powder sample of Example 1-9 (after the activation processing) is a sample which is prepared by the activation processing step and the modifying molecule removing step after continuous electrolytic exfoliation by using the organic solvent (electrolytic solution).

FIG. 22(a) is a picture of the nanobore (pore) which has a shape of a row. The nanobore is continuously formed in the graphene, and so, the nanobore is made in a shape of a crack. FIG. 22(b) is a picture of an independent nanobore (pore) and remaining amorphous carbon. FIG. 22(C) is a picture of a part where substantially grown nanobores (pores) are concentrated. FIG. 22(d) is a high-resolution image of the independent nanobore (pore), and is a picture of a nanobore (pore) which is grown in a rectangular shape.

As illustrated in FIG. 22, the nanobore is introduced at a high density in the powder sample of Example 1-9 (after the activation processing).

Meanwhile, in the powder sample of Example 1-9 (after finishing electrolytic exfoliation), the nanobore is not observed. Accordingly, it is considered that the nanobore which is observed in the powder sample of Example 1-9 (after the activation processing) is formed in the activation processing step.

In addition, as illustrated in Example 3 which will be described later, it was found that the nanobore increases the level of adsorption of the ions of the electrolytic solution, and increases an energy density in the capacitor.

When making a conclusion from the results of observation by the electron microscope, the powder sample of Example 1-9 (after the activation processing), is powder in which the modifying molecules are removed, the nanobore is formed, and many ultrathin graphene pieces in which the number of overlapped graphenes is small, that is, less than 10, are comprised.

Example 2

Review of Organic Solvent Exfoliating Processing Process (Organic Solvent Dispersion Step)

Example 2-1

First, the powder samples of Example 1-1 (after the activation processing) were respectively sufficiently washed by deionized water.

Then, 0.5 g of the powder sample of Example 1-1 (after the activation processing) was sampled and was dispersed in 35 ml of an NMP solution. NMP which was used is spectrophotometric grade and purity is equal to or greater than 99%.

Then, NMP in which the graphene is dispersed had been separated for 3 days under ultrasonic waves. Accordingly, the solution became gray, and in addition to this, a macro aggregates was found. A powder sample of Example 2-1 (after the organic solvent exfoliating processing) was obtained by filtering the solution after removing the produced aggregates.

Then, the powder sample of Example 2-1 (after the organic solvent exfoliating processing) was observed by transmission electron microscope.

Many two-layered graphenes or a single-layered graphenes were found. By adding the organic solvent exfoliating processing by NMP, exfoliating of graphene is reliably performed, and the ratio of the single-layered graphene is increased.

Example 2-2

A powder sample of Example 2-2 (after the organic solvent exfoliating processing) was obtained in conditions similar to those in Example 2-1 except that the powder sample of Example 1-9 (after the activation processing) was used.

Then, the powder sample of Example 2-2 (after the organic solvent exfoliating processing) was observed by a transmission electron microscope.

Many two-layered graphenes or single-layered graphenes were found. By adding the organic solvent exfoliating processing by NMP, exfoliating of graphene is reliably performed, and the ratio of the single-layered graphene is increased.

Example 3

Manufacturing Capacitor

Example 3-1

First, a solution in which the powder sample (graphene prepared by electrolytic exfoliation with a diluted sulfuric acid (electrolytic solution)) of Example 1-1 (after the activation processing) is dispersed in the deionized water, and an aqueous solution in which a single-layered carbon nanotube is similarly dispersed, were prepared.

Then, both solutions are mixed. Accordingly, it is considered that, as the graphene and the carbon nanotube are bound by π-π bonding, the carbon nanotube is bonded to the surface of the graphene, and these structures are overlapped, and the graphene stacks in which the carbon nanotube play a role of a spacer is formed (PTL 4).

Then, a disk-shaped graphene aggregates is prepared by filtering, washing, and drying this solution. A capacitor (capacitor of Example 3-1) which is configured as illustrated in FIG. 14 is manufactured by sticking the graphene aggregates to the substrate as the electrode.

Capacitor Characteristics Evaluation

Then, evaluation of the capacitor of Example 3-1 was performed.

Figure 23:
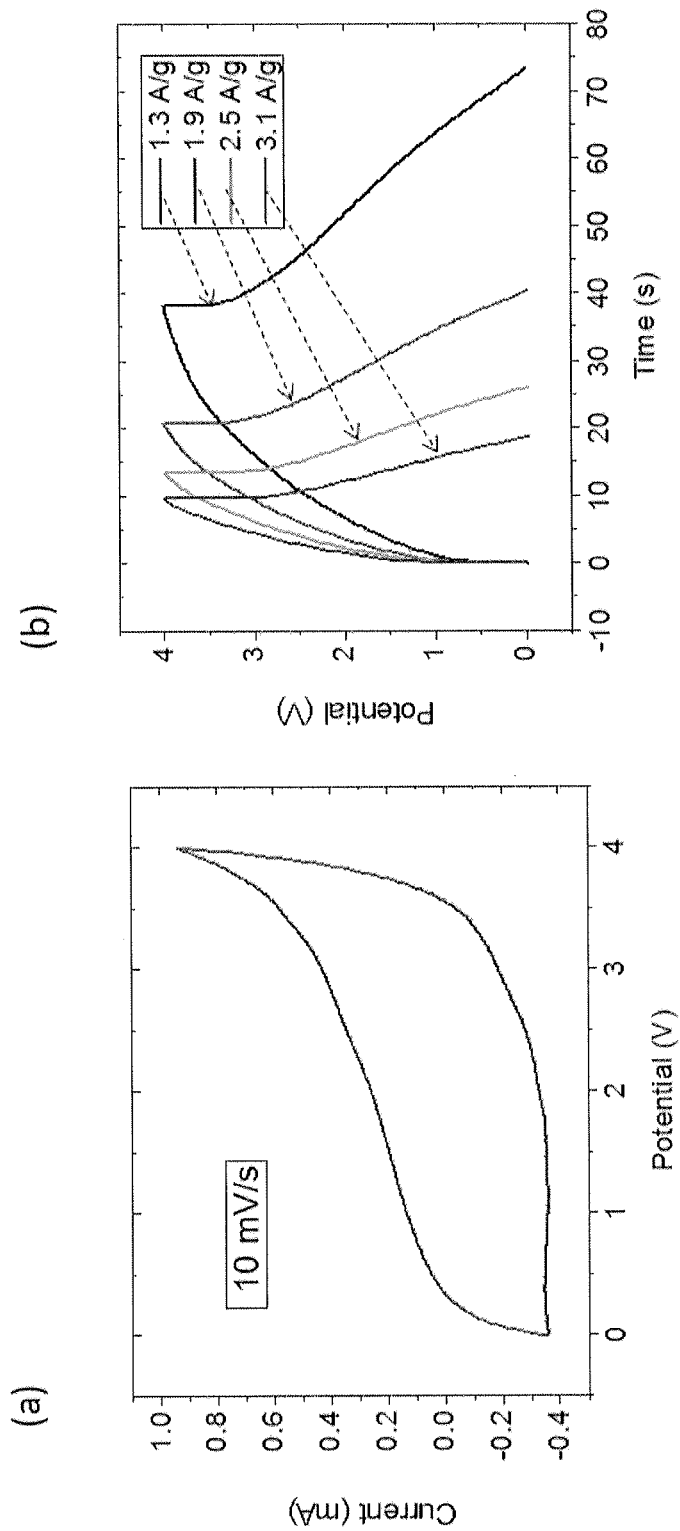
FIG. 23 is electrochemical characteristics of a capacitor of Example 3-1.

FIG. 23 is electrochemical characteristics of the capacitor of Example 3-1. The capacitor of Example 3-1 is a capacitor which uses the diluted sulfuric acid (electrolytic solution) and uses the graphene prepared by continuous electrolytic exfoliation as an electrode.

FIG. 23(a) illustrates current-voltage characteristics when sweeping by 10 mV/s, and FIG. 23(b) illustrates charging-discharging characteristics at a constant current.

The energy density which is calculated from the characteristic reaches 90.3 Wh/kg, and a power density reaches 119.0 kW/kg. These values are values which are much higher than characteristic values reported in the related art.

Experiment Example 1

Comparison of Electrical Resistivity and Transmittance (Transparency) of Graphene Prepared by Different Exfoliation Methods As a method for performing mass production of graphene from graphite at a low coast, the chemical exfoliation method for oxidizing and exfoliating graphite with strong acid, the organic solvent exfoliation method for performing exfoliating from graphite by interaction between the organic solvent and the graphene, and the electrolytic exfoliation method for intercalating the ions of the electrolytic solution between the graphite layers by electrolysis, are employed.

Electrical resistivity and transmittance (transparency) of the graphene which is obtained by a different exfoliation methods were measured.

As illustrated in Table 5, since, in the electrolytic exfoliation method, defects are caused by oxidization of graphene and extra molecules are not modified, transparency is extremely excellent, and conductivity is also excellent.

TABLE 5

| Preparing graphene | Electrical resistivity (Ω/sq) | Transmittance (%) |
| --- | --- | --- |
| Preparing by chemical exfoliation method | 1000-70000 | <80 |
| Preparing by electrolytic exfoliation method | 210-43000 | 96 |
| Preparing by organic solvent exfoliation method | 520-3110 | 63-90 |

In the chemical exfoliation method or the organic solvent exfoliation method, while the graphene is immersed in a strong acid or an organic solvent, a graphene exfoliating action continues by intercalation or interaction with the organic solvent.

Since the surface of the graphene which is prepared by the electrolytic exfoliation method has fewer defects in the preparing process and less modification of oxidative molecules, conductivity or transparency is excellent.

Experiment Example 2

Comparison of Preparing Time of Graphene Prepared by Different Exfoliation Methods, and Comparison of Capacitor Characteristics of Capacitors which Use Graphenes Prepared by Different Exfoliation Methods As described above, the graphene in which the ratio of single-layered graphene is high is obtained by a simple apparatus in a short period of time.

For this, the preparing times of the graphenes which are prepared by each exfoliation method were compared, and capacitances (capacitor characteristics) of the capacitors which use the graphenes prepared by each exfoliation method were compared. Specifically, commercially available graphene which is manufactured by Cheap Tubes Inc., graphene which is prepared by the chemical exfoliation method by the inventors, graphene (graphene which uses the diluted sulfuric acid as the electrolytic solution) which is prepared by the electrolytic exfoliation method, and graphene (graphene which uses the organic solvent (PC) as the electrolytic solution) which is prepared by the electrolytic exfoliation method, were compared. The result thereof is illustrated in Table 6. Data other than data of the graphene manufactured by Cheap Tubes Inc. is data from a laboratory.

TABLE 6

| Preparing graphene | Graphene weight (g) | Preparing time (h) | Capacitance (F/g) |
|---|---|---|---|
| Graphene manufactured by Cheap Tubes Inc. | — | — | 70 |
| Graphene prepared by chemical exfoliation method | 1 | 168 | 360 |
| Graphene prepared by electrolytic exfoliation method (diluted sulfuric acid) | 1 | 5 | 160 |
| Graphene prepared by electrolytic exfoliation method (organic solvent) | 1 | 10 | 131 |

Capacitance of the capacitor which uses the graphene prepared by the chemical exfoliation method by the inventors showed the highest value. It is considered that this is because a layered structure of graphene is formed by using the carboxyl group and the hydroxyl group of the surface of the reduced graphene.

Meanwhile, the graphene which is manufactured by Cheap Tubes Inc. is also graphene which is prepared by the chemical exfoliation method, but capacitance thereof is the lowest. It is considered that this is because a structure thereof is not a layered structure.

In addition, any of capacitances of the capacitors which use the graphene prepared by the electrolytic exfoliation method is also higher than capacitance of the capacitor which uses the graphene manufactured by Cheap Tubes Inc., but is lower that the capacitance of the capacitor which uses the graphene prepared by the chemical exfoliation method. Even in a case of capacitance of the capacitor which uses the graphene prepared by the electrolytic exfoliation method, it is predicted that general capacitance of the capacitor which uses the graphene prepared by the chemical exfoliation method can be achieved if the level of stacking and layering is improved.

Comparative Example 1

Electrolytic Exfoliation was performed in conditions similar to those in Example 1-11 except that the porous filter was not used.

Figure 24:
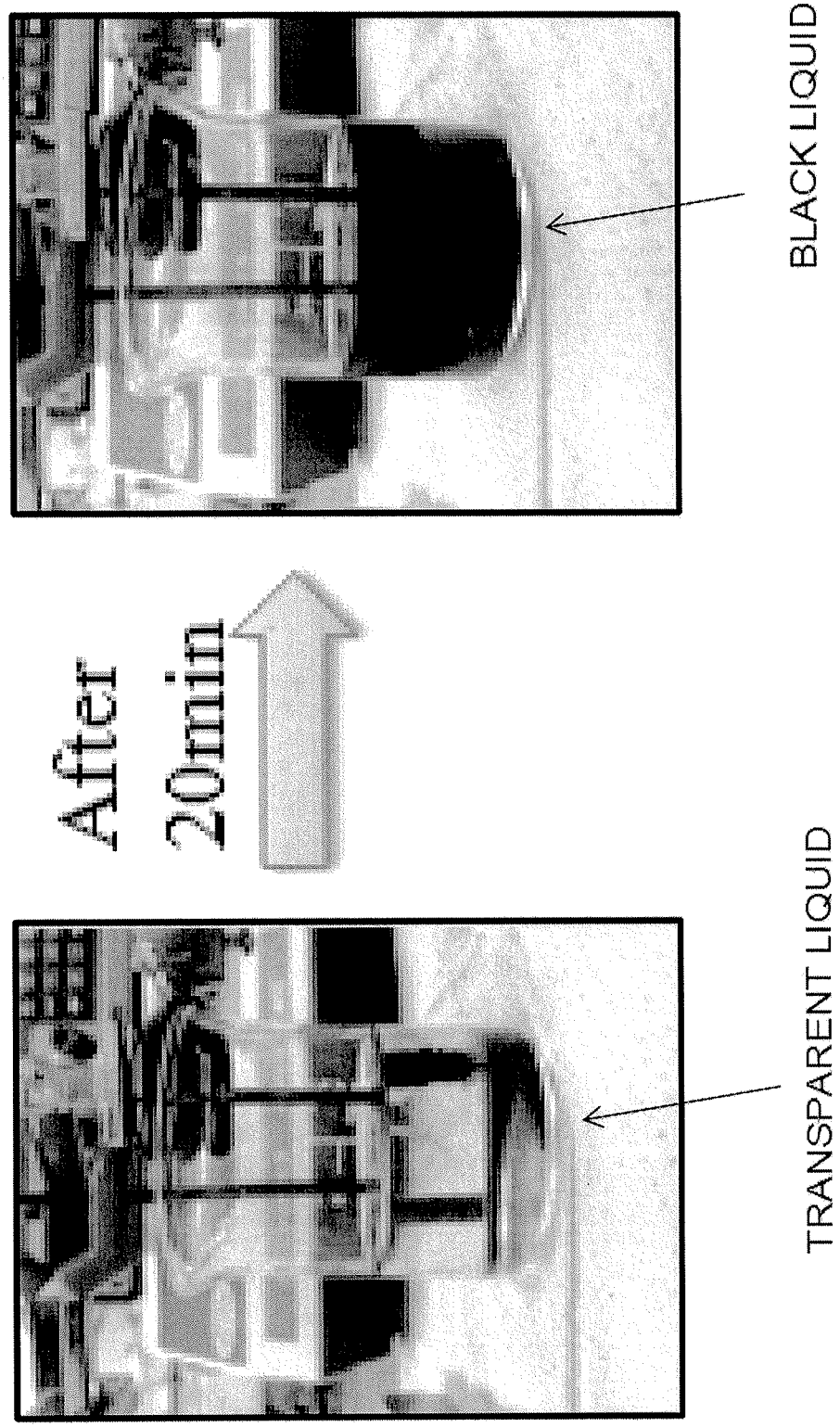
FIG. 24 is a picture illustrating an effect of electrolytic exfoliation after 20 minutes of applying time.

FIG. 24 is a picture illustrating an effect of electrolytic exfoliation after 20 minutes of applying time. The organic solvent. (electrolytic solution) became black liquid from transparent liquid before and after electrolytic exfoliation.

Figure 25:
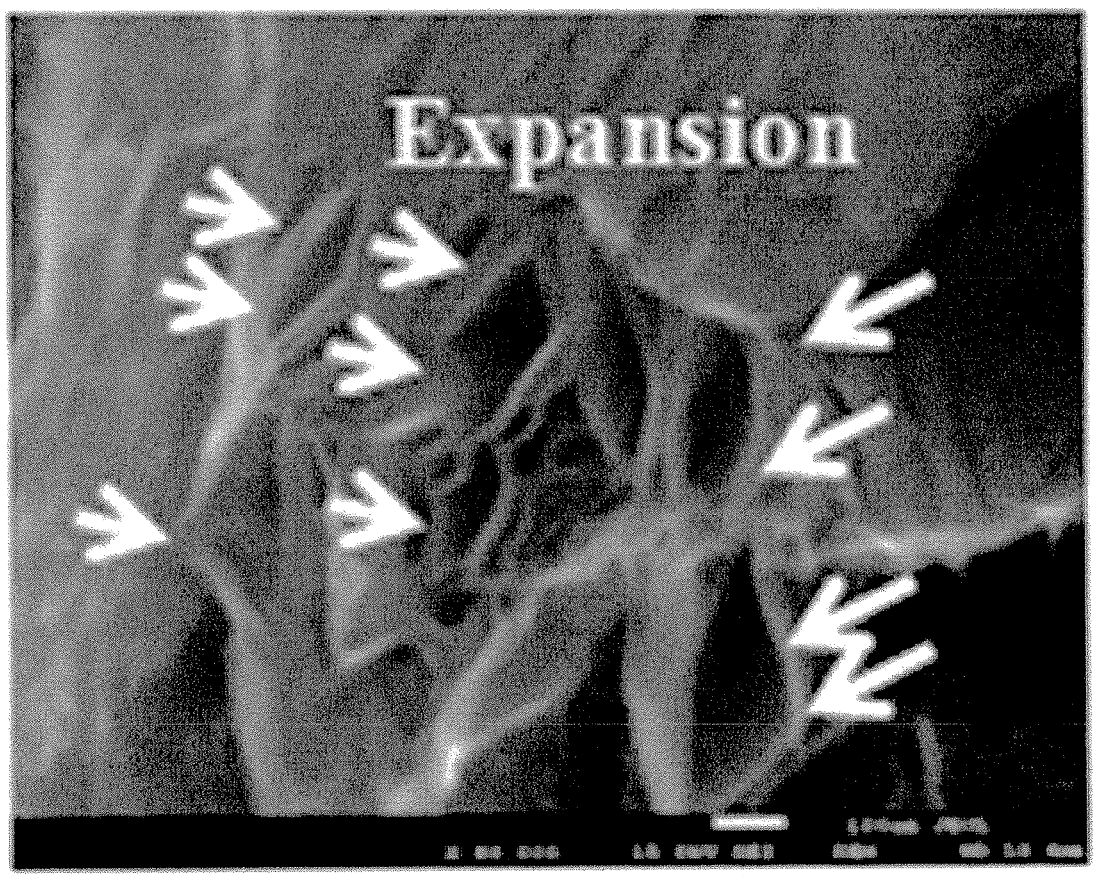
FIG. 25 is an electron micrograph of the surface of the graphite in an expanded state.

FIG. 25 is an electron micrograph of the surface of the graphite in an expanded state. An expanded part is illustrated by an arrow.

Figure 26:
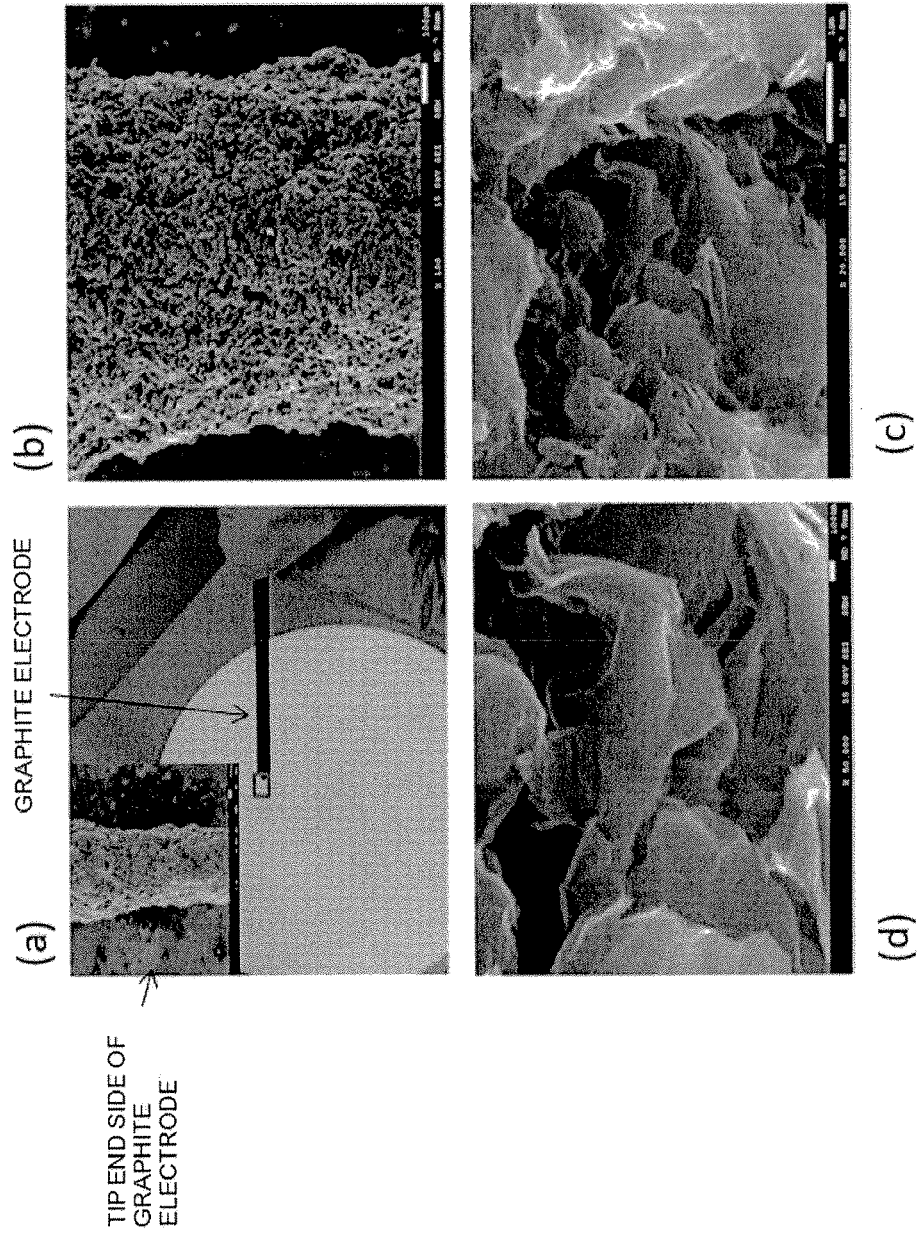
FIG. 26 is a picture of a surface of a graphite electrode.

FIG. 26 is a picture of a surface of a graphite electrode.

FIG. 26(a) is a picture illustrating substantially the entire graphite electrode. The inserted drawing of FIG. 26(a) is an enlarge picture of a tip end part of the graphite electrode. FIG. 26(b) is an enlarge picture of the inserted drawing of FIG. 26(a). FIG. 26(c) is an enlarged picture of FIG. 26(b). FIG. 26(d) is an enlarged picture of FIG. 26(c).

Figure 27:
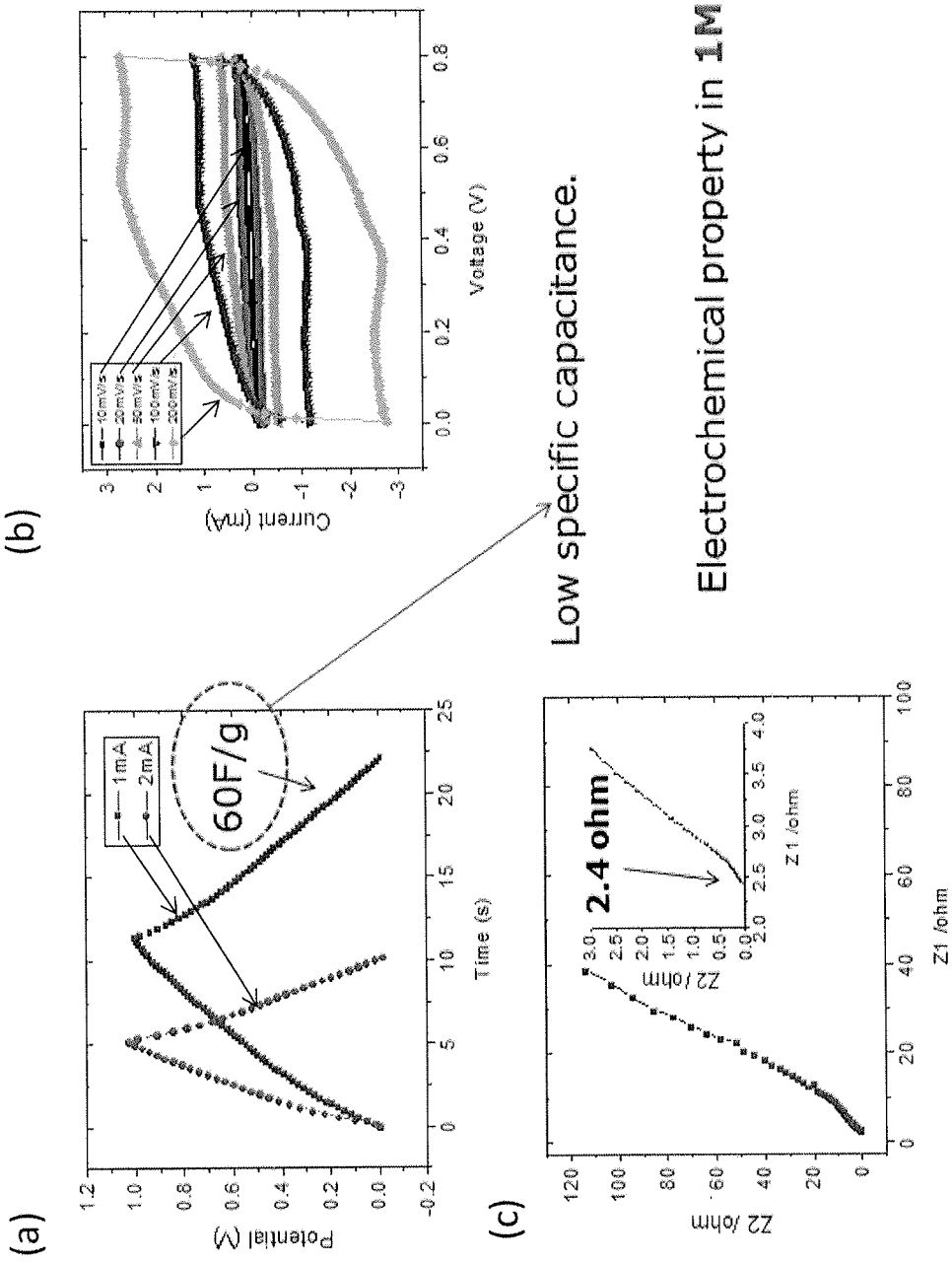
FIG. 27 illustrates electrochemical characteristics of the capacitor which uses graphite of Comparative Example 1.

FIG. 27 illustrates electrochemical characteristics of the capacitor which uses graphite of Comparative Example 1. 1M of KCl is used as the electrolytic solution. Capacitance is low, that is, 60 F/g.

FIG. 27(a) illustrates charging-discharging characteristics at a constant current, FIG. 27(b) illustrates cyclic voltammetry, and FIG. 27(c) illustrates EIS.

INDUSTRIAL APPLICABILITY

Graphene has excellent characteristics, such as high strength, high conductivity, a high thermal conductivity, or fast transistor characteristics, which cannot be found in materials in the related art. In particular, transparency which is derived from the thickness of one carbon atom or an enormous specific surface area is a characteristic which cannot be found in other materials. A transparent conductive film or a capacitor which can be applied in a solar panel and a touch panel that use these characteristics realizes characteristics that exceed the level in the related art, and is highly expected.

In realizing the transparent conductive film or the capacitor, it is necessary to realize a device which has characteristics of the graphene originally embedded therein. For this, a key technology for preparing the transparent conductive film or the capacitor electrode is necessary by exfoliating the graphene one by one by using the obtained one single-layered graphene as a base.

By the method for preparing ultrathin graphene pieces of the present invention, it is successful to realize a simple device and to exfoliate substantially single-layered graphene from graphite. The method for preparing ultrathin graphene pieces of the present invention is a preparing method which can perform mass production at an extremely low cost and is easily industrialized.

In addition, as an application example of the device which uses the ultrathin graphene piece, a prototype of an electric double layer capacitor (super capacitor) is manufactured, and it is confirmed that the electric double layer capacitor is a capacitor having high performance which cannot be found in the related art. Since the ultrathin graphene piece capacitor uses inexpensive material and has excellent performance and durability, the capacitor has marketability.

As described above, the ultrathin graphene piece, the apparatus for preparing ultrathin graphene pieces, method for preparing ultrathin graphene pieces, the capacitor, and the method of manufacturing capacitor of the present invention open a wide range of usage, such as a positive electrode of solar cell that requires a transparent conductive film having a large area, a touch panel, or a video panel of a personal computer or the like, have industrial availability and marketability, and can be used in a panel industry, a capacitor industry, an electronic component industry, or a battery industry.

REFERENCE SIGNS LIST 1, 2, 3, 4, 5 . . . Ultrathin graphene piece
10 . . . Graphene
11 . . . Hole (nanobore)
12 . . . Modifying molecule
20 . . . Apparatus for preparing ultrathin graphene pieces
21 . . . Graphite electrode
22 . . . Counter electrode
23 . . . Porous filter 24 . . . Container
25 . . . Electrolytic solution
26, 27 . . . Wiring
28 . . . Power source
50 . . . Ultrathin graphene piece capacitor
51 . . . Coin cell case main body
52 . . . Coin cell cap
53, 54 . . . Substrate
55, 56 . . . Electrolytic solution impregnated layer
57 . . . Steel spacer
58 . . . Gasket
59 . . . Separator
63, 64 . . . Electrode
73 . . . Dropper
74 . . . Electrolytic solution

The invention claimed is:

1. A method for preparing an ultrathin graphene piece, comprising sequentially applying:
   a first voltage of +0.1 V to +10 V between a graphite electrode used as an anode and a counter electrode used as a cathode for 1 minute to 10 minutes,
   a second voltage of +1 V to +10 V between the graphite electrode and counter electrode for 1 minute to 10 minutes,
   a third voltage of +5 V to +15 V between the graphite electrode and counter electrode for 1 hour to 2 hours, and
   an activation processing step of applying a voltage of +5 V to +15 V between the graphite electrode and counter electrode for 60 minutes to 120 minutes,
   to obtain an ultrathin graphene piece comprising less than 10 overlapped graphene layers and at least one through hole penetrating a front and a rear side of the graphene piece.

2. The method for preparing the ultrathin graphene piece according to claim 1, further comprising, after applying the third voltage, an organic solvent dispersion step of dispersing powder which is obtained by filtering, washing, and drying the electrolytic solution in an organic solvent, and irradiating ultrasonic waves.

3. The method for preparing the ultrathin graphene piece according to claim 2, wherein the organic solvent is at least one selected from the group consisting of N-methylpyrrolidone (NMP), dimethylformamide (DMF), N,N-Dimethylacetamide (DMA), γ-buthyrolactone (GBL), and 1,3-dimethyl-2-imidazolidinone (DMEU).

4. The method for preparing the ultrathin graphene piece according to claim 1, further comprising, after the activation processing step, a modifying molecule removing step of applying a voltage in a reverse direction with the same value of the voltage applied in the activation processing step.

5. The method for preparing the ultrathin graphene piece according to claim 4, further comprising repeating the activation processing step and the modifying molecule removing step at least two times.

6. The method for preparing the ultrathin graphene piece according to claim 1,
   wherein the first voltage, the second voltage and the third voltage are applied between the graphite electrode and the counter electrode with an apparatus comprising:
   the graphite electrode;
   the counter electrode made of graphite, a corrosion resistant alloy, or a precious metal;
   an electrolytic solution, wherein one side of the graphite electrode and one side of the counter electrode are immersed in the electrolytic solution;
   a container storing the electrolytic solution;
   a power source connected to the graphite electrode and counter electrode via wirings, and
   a porous filter covering at least the immersed side of the graphite electrode immersed in the electrolytic solution.

* * * * *